United States Patent
Miyashita et al.

(10) Patent No.: US 7,646,686 B2
(45) Date of Patent: Jan. 12, 2010

(54) RECORDING/REPRODUCTION APPARATUS WHICH ADJUSTS RECORDING POWER BASED ON A PARTIAL RESPONSE MAXIMUM LIKELIHOOD (PRML) TECHNIQUE

(75) Inventors: Harumitsu Miyashita, Nara (JP); Takeshi Nakajima, Nara (JP); Mamoru Shoji, Osaka (JP); Yasumori Hino, Nara (JP)

(73) Assignee: Panasonic Corporation, Kadoma (JP)

( * ) Notice: Subject to any disclaimer, the term of this patent is extended or adjusted under 35 U.S.C. 154(b) by 850 days.

(21) Appl. No.: 10/981,869

(22) Filed: Nov. 5, 2004

(65) Prior Publication Data

US 2005/0128911 A1    Jun. 16, 2005

(30) Foreign Application Priority Data

Nov. 6, 2003    (JP)    ............................ 2003-376855

(51) Int. Cl.
*G11B 7/00*    (2006.01)
(52) U.S. Cl. .................. 369/47.53; 369/59.22; 369/116
(58) Field of Classification Search .............. 369/47.53, 369/59.22, 116

See application file for complete search history.

(56) References Cited

U.S. PATENT DOCUMENTS

| | | | | |
|---|---|---|---|---|
| 6,839,310 | B2* | 1/2005 | Yoshida | .................. 369/47.53 |
| 7,095,696 | B2* | 8/2006 | Nakajima et al. | ......... 369/59.12 |
| 7,215,624 | B2* | 5/2007 | Kashihara | ................. 369/59.22 |
| 2001/0006500 | A1 | 7/2001 | Nakajima | |
| 2003/0043939 | A1* | 3/2003 | Okumura et al. | ............. 375/341 |

FOREIGN PATENT DOCUMENTS

| | | |
|---|---|---|
| CN | 1383133 | 12/2004 |
| EP | 1 251 498 | 10/2002 |
| EP | 1 679 709 | 7/2006 |
| JP | 06-195716 | 7/1994 |
| JP | 10-064064 | 3/1998 |
| JP | 2002-319133 | 10/2002 |
| JP | 2003-141823 | 5/2003 |

OTHER PUBLICATIONS

European Search Report regarding Application No. 04026435.0 dated Aug. 20, 2007.
Chinese Office Action for corresponding Application No. 200410087448.8 dated Feb. 22, 2008.
Japanese Office Action for corresponding Application No. 2004-322363 dated Feb. 24, 2009.

* cited by examiner

*Primary Examiner*—Wayne R Young
*Assistant Examiner*—LaTanya Bibbins
(74) *Attorney, Agent, or Firm*—Renner, Otto, Boisselle & Sklar, LLP

(57) ABSTRACT

A recording/reproduction apparatus, comprising a first recording section for recording test information onto a medium using at least one recording power, a reproduction section for reproducing at least one test signal indicating the test information from the medium, and a second recording section for recording information onto the medium using one of the at least one recording power. The reproduction section comprises a decoding section for performing maximum likelihood decoding of the at least one test signal and generating at least one binary signal indicating a result of the maximum likelihood decoding, a calculation section for calculating a reliability of the result of the maximum likelihood decoding based on the at least one test signal and the at least one binary signal, and an adjustment section for adjusting a recording power for recording the information onto the medium to the one recording power based on the reliability.

2 Claims, 20 Drawing Sheets

State transition diagram A

Distribution of Pa-Pb

Distribution of |Pa-Pb|-Pstd (a) Address unit (b) Addition interval gate signal (c) Resistor enable signal Recording pattern for learning

2M3S2M4S2M2S3M3S3M4S3M5S4M
2S4M3S4M4S4M5S5M2S5M3S5M4S5M5S 1100011000110000111001110000111001111
000111110000111110001111110000111110000

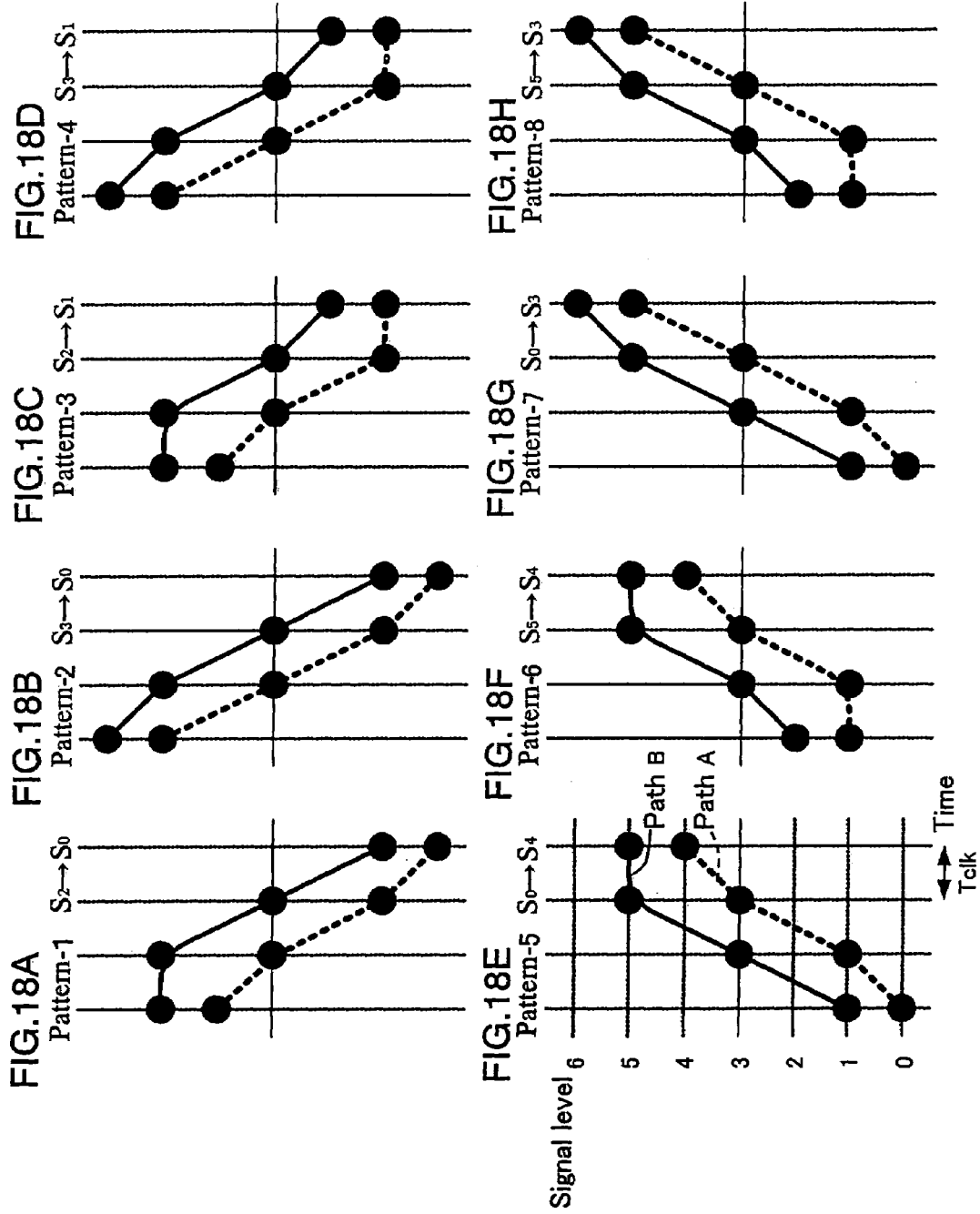

FIG.19A
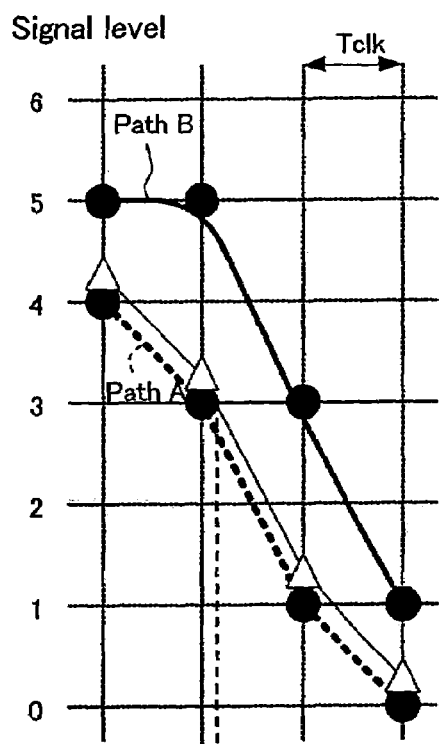
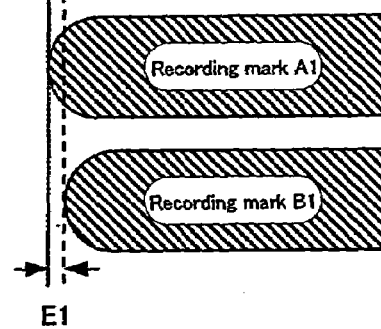
FIG.19B
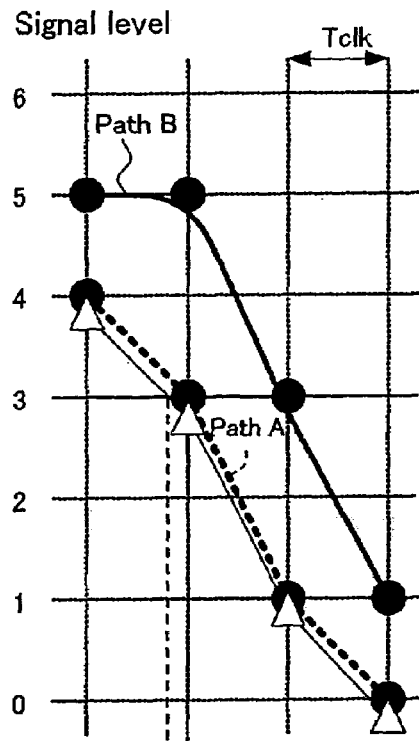
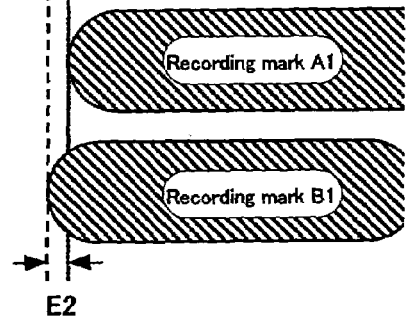

FIG.21

| Tsfp | 2Tm | 3Tm | 4Tm | 5Tm or more |
|---|---|---|---|---|
| 2Ts | 2Ts2Tm | 2Ts3Tm | 2Ts4Tm | 2Ts5Tm |
| 3Ts | 3Ts2Tm | 3Ts3Tm | 3Ts4Tm | 3Ts5Tm |
| 4Ts | 4Ts2Tm | 4Ts3Tm | 4Ts4Tm | 4Ts5Tm |
| 5Ts or more | 5Ts2Tm | 5Ts3Tm | 5Ts4Tm | 5Ts5Tm |

| Telp | 2Tm | 3Tm | 4Tm | 5Tm or more |
|---|---|---|---|---|
| 2Ts | 2Tm2Ts | 3Tm2Ts | 4Tm2Ts | 5Tm2Ts |
| 3Ts | 2Tm3Ts | 3Tm3Ts | 4Tm3Ts | 5Tm3Ts |
| 4Ts | 2Tm4Ts | 3Tm4Ts | 4Tm4Ts | 5Tm4Ts |
| 5Ts or more | 2Tm5Ts | 3Tm5Ts | 4Tm5Ts | 5Tm5Ts |

FIG.22

| Tsfp | 2Tm | 3Tm | 4Tm | 5Tm or more |
|---|---|---|---|---|
| 2Ts |  | P3A | P1A | P1A |
| 3Ts | P3B | P1B/P4A | P1B/P2A | P1B/P2A |
| 4Ts | P4B | P2B/P4A | P2B/P2A | P2B/P2A |
| 5Ts or more | P4B | P2B/P4A | P2B/P2A | P2B/P2A |

| Telp | 2Tm | 3Tm | 4Tm | 5Tm or more |
|---|---|---|---|---|
| 2Ts |  | P6A | P5A | P5A |
| 3Ts | P6B | P5B/P8A | P5B/P7A | P5B/P7A |
| 4Ts | P8B | P7B/P8A | P7B/P7A | P7B/P7A |
| 5Ts or more | P8B | P7B/P8A | P7B/P7A | P7B/P7A |

RECORDING/REPRODUCTION APPARATUS WHICH ADJUSTS RECORDING POWER BASED ON A PARTIAL RESPONSE MAXIMUM LIKELIHOOD (PRML) TECHNIQUE

This nonprovisional application claims priority under 35 U.S.C. §119(a) on Patent Application No. 2003-376855 filed in Japan on Nov. 6, 2003, the entire contents of which are hereby incorporated by reference.

BACKGROUND OF THE INVENTION

1. Field of the Invention

The present invention relates to a recording/reproduction apparatus, recording/reproduction method, program, and recording power adjustment apparatus capable of adjusting a recording power (e.g., a write power, an erase power, or a bottom power). More particularly, the present invention relates to a recording/reproduction apparatus, recording/reproduction method, program, and recording power adjustment apparatus capable of adjusting a recording power based on a partial response maximum likelihood (PRML) technique which is a type of reproduction technique.

2. Description of the Related Art

Phase change optical discs (CD-RW, DVD-RAM, DVD-RW, Blu-ray Disc, etc.) are known as rewritable optical discs. For phase change optical discs, multipulse laser light is used to perform overwrite recording. Laser light has, for example, a write power Pw, an erase power Pe and a bottom power Pb.

FIG. 24 shows a multipulse having a write power Pw, an erase power Pe and a bottom power Pb.

The write power Pw is used to change the state of a recording film from a crystal state to an amorphous state so as to form a mark. The erase power Pe is used to change the state of the recording film from the amorphous state to the crystal state so as to erase (overwrite) an old mark. The bottom power Pb corresponds to a power of a bottom portion of a multipulse, and is used to prevent thermal diffusion due to irradiation of laser light during recording using a multipulse.

Conventionally, in recording/reproduction methods and recording/reproduction apparatuses for recording digital information onto a recording medium, a test signal is recorded onto a recording medium while changing the write power Pw, the erase power Pe and the bottom power Pb in various manners, and the recorded test signal is reproduced. A predetermined signal evaluation index is detected to determine whether or not the recorded state of the signal is normal. In order to achieve the recorded state which allows an optimum or desired state of a predetermined signal evaluation index, the power of laser light is controlled and determined. Examples of the predetermined signal evaluation index include jitter, asymmetry, an error rate (a bit error rate (BER)), the degree of modulation, and the like (e.g., Japan Patent No. 3259642 (particularly, FIG. 1)).

Alternatively, a method for controlling and determining the power of laser light by referencing a signal evaluation index based on a PRML expected value error has been proposed. For example, Partial Response Maximum Likelihood (PRML) is a signal processing technique which can be expected to improve reproduction performance when original digital information is reproduced from a recording medium. PRML is a combination of waveform equalization called PR and maximum likelihood decoding called ML.

Conventionally, the characteristics of a recording/reproduction transmission path are evaluated based on jitter in a binary pulse and a reproduced clock. However, it has been difficult to evaluate and optimize the characteristics of a reproduction transmission path based on the PRML technique. This is because jitter is not correlated with the performance (BER) of the PRML technique.

For example, Japanese Laid-Open Publication No. 2003-141823 (particularly, page 79, expression (14); page 173, and FIG. 14) discloses a technique in which an expected value error correlated with the BER of the PRML technique is used as an index instead of jitter. This index is used as an index to indicate the probability of occurrence of error due to stress in a reproduction system, such as a focus offset, a tilt or the like. The index is also used in best focus search or the like. In other words, the index is used to optimize a parameter which determines whether or not a reproduced state is normal.

However, in a method and apparatus which determines an optimum recording power using asymmetry as an index, the optimum power may not be obtained due to insufficient precision in detection of asymmetry. In a method and apparatus which determines an optimum recording power with the PRML technique using jitter as an index, the optimum power may not be correctly obtained, since a recording power minimizing jitter is not necessarily equal to a recording power minimizing BER. In a method and apparatus which determines an optimum recording power with the PRML technique using BER as an index, the optimum power may not be obtained due to insufficient precision in detection of the index. The insufficient precision of detection of the indexes is attributed to the requirement of a large quantity of recording area for measurement of BER, the degradation of BER due to stain, dust or the like on a disc rather than a recorded state, a change in BER (sensitivity) to a recording power due to the high error correction capability of the PRML technique, or the like.

As described above, when a conventional method of setting a parameter for a recording power in a manner which optimizes jitter, asymmetry or BER (e.g., Japan Patent No. 3259642) is applied to a system which employs the PRML technique, the probability of occurrence of error is not necessarily minimized. In addition, a recording power is not necessarily determined with good precision due to insufficient precision of detection of an index for determining a recording power. Therefore, a degradation in performance occurs due to cross power (overwrite is performed on a recorded area of a disc under different conditions), which is generated due to error in setting a recording power. Therefore, it may be difficult to obtain the stable compatibility of optical disc drive apparatuses and optical disc media to the same standard.

SUMMARY OF THE INVENTION

According to an aspect of the present invention, a recording/reproduction apparatus is provided, which comprises a first recording section for recording at least one piece of test information onto a medium using at least one recording power, a reproduction section for reproducing at least one test signal indicating the at least one piece of test information from the medium, and a second recording section for recording information onto the medium using one of the at least one recording power. The reproduction section comprises a decoding section for performing maximum likelihood decoding of the at least one test signal and generating at least one binary signal indicating a result of the maximum likelihood decoding, a calculation section for calculating a reliability of the result of the maximum likelihood decoding based on the at least one test signal and the at least one binary signal, and an adjustment section for adjusting a recording power for recording the information onto the medium to the one recording power based on the reliability.

In one embodiment of this invention, the calculation section calculates the reliability based on a test signal of the at least one test signal corresponding to an edge of a recorded mark formed on the medium and a binary signal of the at least one binary signal corresponding to the edge of the recorded mark.

In one embodiment of this invention, the calculation section calculates the reliability based on a plurality of test signals corresponding to edges of a plurality of recorded marks formed on the medium and a plurality of binary signals corresponding to the edges of the plurality of recorded marks.

In one embodiment of this invention, the first recording section records a piece of test information onto the medium using a plurality of recording powers.

In one embodiment of this invention, the first recording section records a plurality of pieces of test information onto the medium using a plurality of recording powers.

In one embodiment of this invention, the first recording section records a piece of test information onto the medium using a single recording power.

In one embodiment of this invention, the first recording section records a plurality of pieces of test information onto the medium using a single recording power.

In one embodiment of this invention, the reproduction section reproduces at least one first signal indicating the information from the medium. The decoding section performs maximum likelihood decoding of the at least one first signal and generates at least one first binary signal indicating a result of the maximum likelihood decoding. The calculation section calculates a reliability of the result of the maximum likelihood decoding based on the at least one first signal and the at least one first binary signal. The adjustment section adjusts a recording power for recording information onto the medium based on the reliability.

In one embodiment of this invention, the recording power to be adjusted includes at least one of a write power, an erase power and a bottom power.

In one embodiment of this invention, the at least one test signal includes a pattern having a shortest data cycle and a pattern having a longest data cycle in a recording modulation rule, and the probability of occurrence of a recorded mark is equal to the probability of occurrence of a space.

In one embodiment of this invention, the calculation section calculates modulation degree characteristics based on an amplitude of the at least one test signal. The adjustment section adjusts a recording power for recording the information onto the medium to the one recording power based on at least one of the reliability and the modulation degree characteristics.

In one embodiment of this invention, the adjustment section adjusts at least one of an erase power and a bottom power based on the reliability. The adjustment section adjusts a write power based on the modulation degree characteristics.

In one embodiment of this invention, a test signal for calculating the reliability includes the pattern having the shortest data cycle and the pattern having the longest data cycle, and the probability of occurrence of the recorded mark is equal to the probability of occurrence of the space. A test signal for calculating the modulation degree characteristics includes the pattern having the longest data cycle.

In one embodiment of this invention, the decoding section comprises an A/D conversion section for sampling the at least one test signal using a test clock synchronized with the at least one test signal, a digital filter for shaping a waveform of data output from the A/D conversion section to predetermined PR equalization characteristics, and a maximum likelihood decoding section for generating at least one binary signal, which is most probable, from output data of the digital filter. The calculation section comprises a differential metric detection section for detecting a reliability value of a result of decoding by the maximum likelihood decoding section based on a state transition sequence estimated by the maximum likelihood decoding section and a result of calculation of an Euclid distance between the output data of the digital filter and a target value used in maximum likelihood decoding, and a determination section for determining whether or not a recorded state is normal based on an output of the differential metric detection section. The adjustment section comprises a laser power control section for controlling a laser power to output laser light having a predetermined recording power.

In one embodiment of this invention, the calculation section further comprises a modulation degree detection section for detecting the modulation degree characteristics based on an amplitude of the at least one test signal. The determination section determines whether or not the recorded state is normal based on at least one of an output of the differential metric detection section and an output of the modulation degree detection section.

In one embodiment of this invention, the decoding section performs maximum likelihood decoding using a recording code having a minimum polarity reversal interval of 2 and a state transition rule defined by an equalization system PR (C0, C1, C1, C0).

According to another aspect of the present invention, a recording/reproduction apparatus is provided, which comprises a first recording section for recording at least one piece of test information onto a medium using at least one recording power, a reproduction section for reproducing at least one test signal indicating the at least one piece of test information from the medium, and a second recording section for recording information onto the medium using one of the at least one recording power. The reproduction section comprises a decoding section for performing maximum likelihood decoding of the at least one test signal and generating at least one binary signal indicating a result of the maximum likelihood decoding, a calculation section for calculating a reliability of the result of the maximum likelihood decoding based on a test signal of the at least one test signal corresponding to an edge of a recorded mark formed on the medium and a binary signal of the at least one binary signal corresponding to the edge of the recorded mark, and an adjustment section for adjusting a recording power for recording the information onto the medium to the one recording power based on the reliability.

According to another aspect of the present invention, a recording/reproduction method is provided, which comprises recording at least one piece of test information onto a medium using at least one recording power, reproducing at least one test signal indicating the at least one piece of test information from the medium, and recording information onto the medium using one of the at least one recording power. The reproducing step comprises performing maximum likelihood decoding of the at least one test signal and generating at least one binary signal indicating a result of the maximum likelihood decoding, calculating a reliability of the result of the maximum likelihood decoding based on the at least one test signal and the at least one binary signal, and adjusting a recording power for recording the information onto the medium to the one recording power based on the reliability.

According to another aspect of the present invention, a recording/reproduction method is provided, which comprises recording at least one piece of test information onto a medium using at least one recording power, reproducing at least one test signal indicating the at least one piece of test information from the medium, and recording information onto the medium using one of the at least one recording power. The reproducing step comprises performing maximum likelihood decoding of the at least one test signal and generating at least one binary signal indicating a result of the maximum likelihood decoding, calculating a reliability of the result of the maximum likelihood decoding based on a test signal of the at least one test signal corresponding to an edge of a recorded mark formed on the medium and a binary signal of the at least one binary signal corresponding to the edge of the recorded mark, and adjusting a recording power for recording the information onto the medium to the one recording power based on the reliability.

According to another aspect of the present invention, a program for causing a computer to execute a recording power adjustment procedure is provided. The recording power adjustment procedure comprises recording at least one piece of test information onto a medium using at least one recording power, reproducing at least one test signal indicating the at least one piece of test information from the medium, and recording information onto the medium using one of the at least one recording power. The reproducing step comprises performing maximum likelihood decoding of the at least one test signal and generating at least one binary signal indicating a result of the maximum likelihood decoding, calculating a reliability of the result of the maximum likelihood decoding based on the at least one test signal and the at least one binary signal, and adjusting a recording power for recording the information onto the medium to the one recording power based on the reliability.

According to another aspect of the present invention, a program for causing a computer to execute a recording power adjustment procedure is provided. The recording power adjustment procedure comprises recording at least one piece of test information onto a medium using at least one recording power, reproducing at least one test signal indicating the at least one piece of test information from the medium, and recording information onto the medium using one of the at least one recording power. The reproducing step comprises performing maximum likelihood decoding of the at least one test signal and generating at least one binary signal indicating a result of the maximum likelihood decoding, calculating a reliability of the result of the maximum likelihood decoding based on a test signal of the at least one test signal corresponding to an edge of a recorded mark formed on the medium and a binary signal of the at least one binary signal corresponding to the edge of the recorded mark, and adjusting a recording power for recording the information onto the medium to the one recording power based on the reliability.

According to another aspect of the present invention, a recording power adjustment apparatus is provided, which comprises a decoding section for performing maximum likelihood decoding of at least one test signal from a medium and generating at least one binary signal indicating a result of the maximum likelihood decoding, a calculation section for calculating a reliability of the result of the maximum likelihood decoding based on the at least one test signal and the at least one binary signal, and an adjustment section for adjusting a recording power for recording the information onto the medium to the one recording power based on the reliability.

According to another aspect of the present invention, a recording power adjustment apparatus is provided, which comprises a decoding section for performing maximum likelihood decoding of at least one test signal from a medium and generating at least one binary signal indicating a result of the maximum likelihood decoding, a calculation section for calculating a reliability of the result of the maximum likelihood decoding based on a test signal of the at least one test signal corresponding to an edge of a recorded mark formed on the medium and a binary signal of the at least one binary signal corresponding to the edge of the recorded mark, and an adjustment section for adjusting a recording power for recording the information onto the medium to the one recording power based on the reliability.

According to the recording/reproduction apparatus, the recording/reproduction method, the program and the recording power adjustment apparatus of the present invention, a recording power during recording is optimized by using a reproduced signal evaluation index which is correlated with decoding performance in a processing system employing maximum likelihood decoding (PRML) for processing a reproduced signal. As a result, a recorded state can be optimized and error can be minimized during reproduction. In the present invention, a change in reproduced waveform due to a change in recording power can be detected with high precision, as compared to when a reproduced signal quality index, such as jitter, asymmetry, BER or the like, which are conventionally used for recording power control is used. Therefore, recording power control can be performed with high precision. Therefore, performance degradation due to cross power can be minimized, resulting in stable compatibility of optical disc drive apparatuses and optical disc media having the same standard.

Thus, the invention described herein makes possible the advantages of providing a recording/reproduction apparatus, recording/reproduction method, program and recording power adjustment apparatus, which have a higher sensitivity of detection of a degradation in a reproduced waveform due to deviation of recording conditions and do not require a large quantity of test writing area; and a recording/reproduction apparatus, recording/reproduction method, program and recording power adjustment apparatus capable of suppressing a degradation in performance due to a cross power and having stable compatibility of optical disc drive apparatuses and recording media having the same standard.

These and other advantages of the present invention will become apparent to those skilled in the art upon reading and understanding the following detailed description with reference to the accompanying figures.

BRIEF DESCRIPTION OF THE DRAWINGS

FIGS. 18A to 18H are diagrams showing sample values of 8 patterns (Pattern-1 through Pattern-8).

FIGS. 19A and 19B are diagrams showing a correlation between a reproduction waveform and a shift of a recording mark of Pattern-1 of FIG. 18A where path A is the correct path.

FIG. 21 is a table showing a list of recording parameters requiring optimization.

FIG. 22 is a table showing a pattern(s) of particular eight patterns which is used to detect a recording parameter requiring optimization.

DESCRIPTION OF THE PREFERRED EMBODIMENTS

Hereinafter, the present invention will be described by way of illustrative examples with reference to the accompanying drawings.

1. Index M

Firstly, a reproduced signal evaluation index (index M), which is referenced in the present invention, will be described. For example, a reproduced signal evaluation index M will be described where a recording code (e.g., (1, 7) Run Length Limited code) having a minimum polarity reversal interval of 2 is used to shape a signal waveform for PR (1, 2, 2, 1) equalization of the frequency characteristics of a signal during a recording/reproduction operation.

After test recording, a series of digital signals (binary signal "1" or "0") reproduced from a recording track include a recording code $b_k$ at current time k, a recording code $b_{k-1}$ at time k-1 (a unit time before the current time), a recording code $b_{k-2}$ at time k-2 (two unit times before the current time), and a recording code $b_{k-3}$ at time k-3 (three unit times before the current time). An ideal output value $Level_v$ of PR (1, 2, 2, 1) equalization is represented by:

$$Level_v = b_{k-3} + 2b_{k-2} + 2b_{k-1} + b_k \quad \text{(Expression 1)}$$

where k is an integer indicating time and v is an integer of 0 to 6.

A state transition table is show in Table 1 below, where a state at time k is represented by $S(b_{k-2}, b_{k-1}, b_k)$.

TABLE 1

State transition based on a combination of a recording code having a minimum polarity reversal interval of 2 and PR (1, 2, 2, 1)

| State at time k − 1 $S(b_{k-3}, b_{k-2}, b_{k-1})$ | State at time k $S(b_{k-2}, b_{k-1}, b_k)$ | $B_k/Level_v$ |
|---|---|---|
| S(0, 0, 0) | S(0, 0, 0) | 0/0 |
| S(0, 0, 0) | S(0, 0, 1) | 1/1 |
| S(0, 0, 1) | S(0, 1, 1) | 1/3 |
| S(0, 1, 1) | S(1, 1, 0) | 0/4 |
| S(0, 1, 1) | S(1, 1, 1) | 1/5 |
| S(1, 0, 0) | S(0, 0, 0) | 0/1 |
| S(1, 0, 0) | S(0, 0, 1) | 1/2 |
| S(1, 1, 0) | S(1, 0, 0) | 0/3 |
| S(1, 1, 1) | S(1, 1, 0) | 0/5 |
| S(1, 1, 1) | S(1, 1, 1) | 1/6 |

Figure 1:
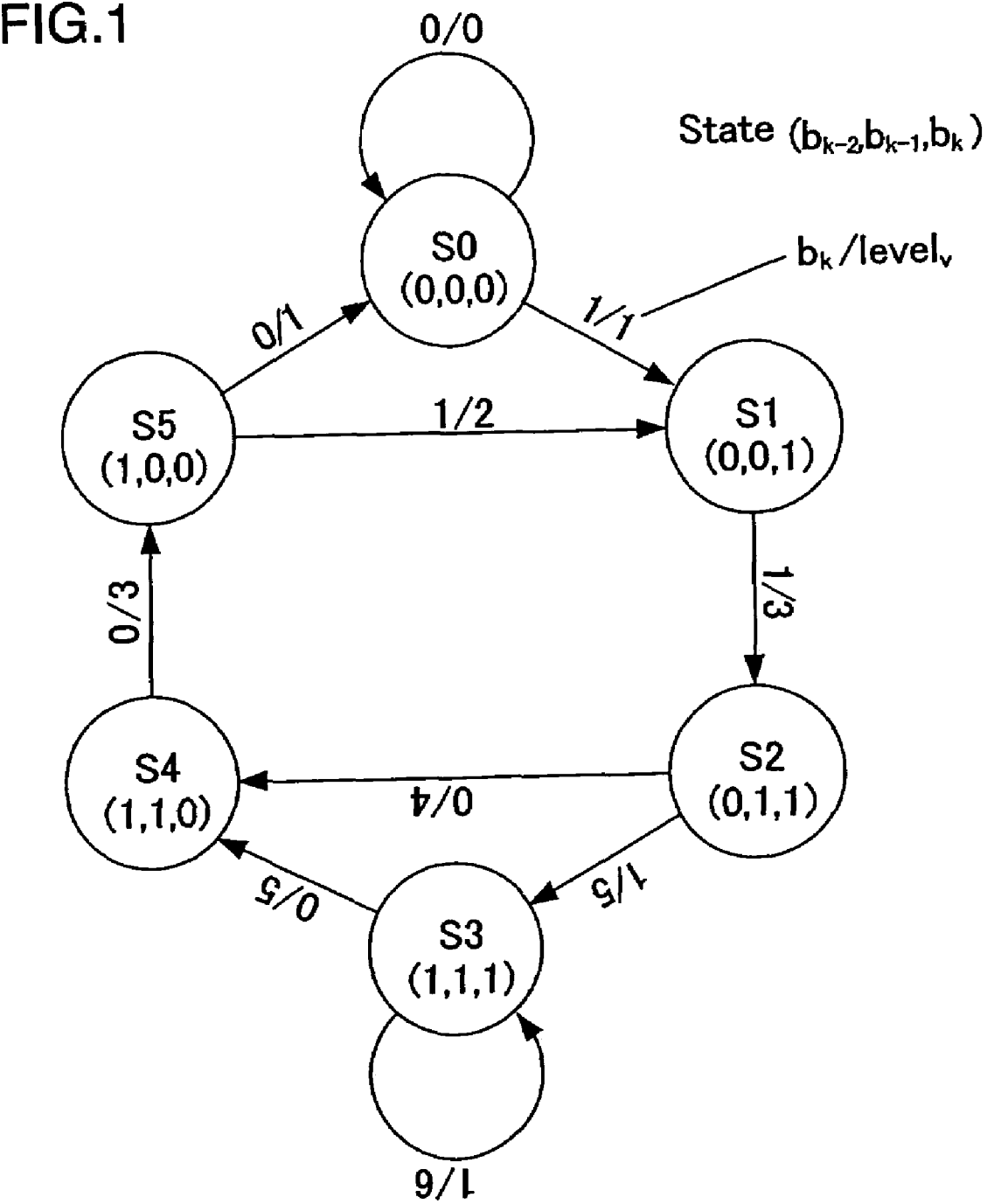
FIG. 1 is a state transition diagram representing a state transition rule which is defined based on a recording code having a minimum polarity reversal interval of 2 and an equalization system PR (1, 2, 2, 1).

FIG. 1 shows a state transition diagram A where a state $S(0, 0, 0)_k$ at time k is represented by $S0_k$, a state $S(0, 0, 1)_k$ is represented by $S1_k$, a state $S(0, 1, 1)_k$ is represented by $S2_k$, a state $S(1, 1, 1)_k$ is represented by $S3_k$, a state $S(1, 1, 0)_k$ is represented by $S4_k$, and a state $S(1, 0, 0)_k$ is represented by $S5_k$ for the sake of simplicity.

FIG. 1 shows a state transition diagram A representing a state transition rule which is defined based on a recording code having a minimum polarity reversal interval of 2 and an equalization system PR (1, 2, 2, 1).

Figure 2:
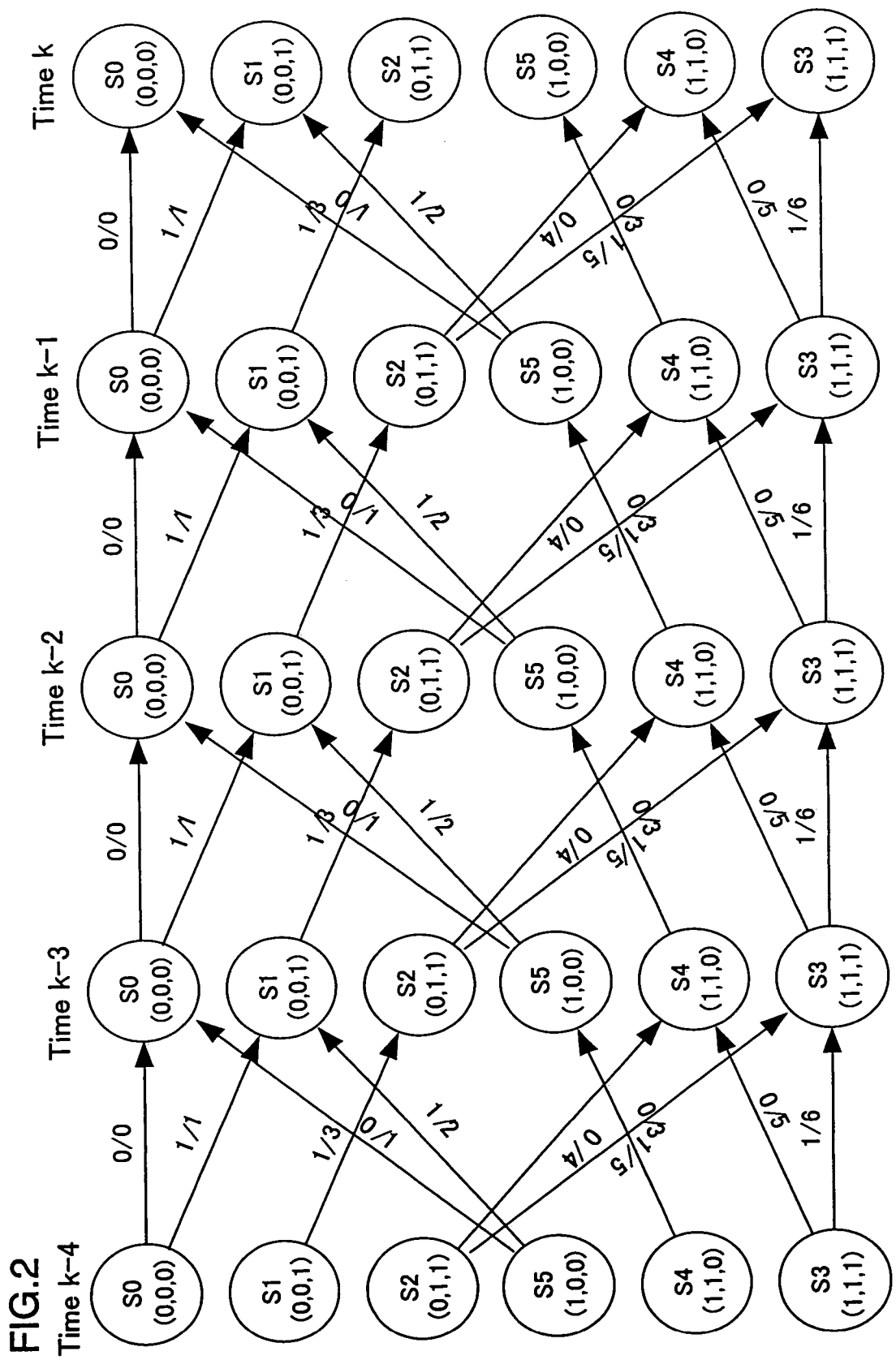
FIG. 2 is a trellis diagram which is obtained by extending the state transition diagram A along a time axis.

FIG. 2 shows a trellis diagram which is obtained by extending the state transition diagram A along a time axis.

Hereinafter, state transition defined based on a recording code having a minimum polarity reversal interval of 2 and an equalization system PR (1, 2, 2, 1) will be described with reference to FIGS. 1 and 2.

See a state $S0_k$ at time k and a state state $S0_{k-4}$ at time k-4. FIG. 2 shows two possible state transition sequences between the state $S0_k$ and the state $S0_{k-4}$. One of the possible state transition sequences is referred to as a path A. The path A is a transition sequence of states $S2_{k-4}, S4_{k-3}, S5_{k-2}, S0_{k-1}$ and $S0_k$. The other state transition sequence is referred to as a path B. The path B is a transition sequence of states $S2_{k-4}, S3_{k-3}, S4_{k-2}, S5_{k-1}$ and $S0_k$. The results of maximum likelihood decoding from time k-6 to time k is represented by ($C_{k-6}, C_{k-5}, C_{k-4}, C_{k-3}, C_{k-2}, C_{k-1}, Ck$). In this case, when the decoding result ($C_{k-6}, C_{k-5}, C_{k-4}, C_{k-3}, C_{k-2}, C_{k-1}, C_k$) is (0, 1, 1, x, 0, 0, 0) where x is 0 or 1, it is estimated that the state transition sequence of the path A or the path B is most probable. The path A and the path B have the same probability that a state at time k-4 is the state $S2_{k-4}$. Therefore, by calculating a value of sum of squares of differences between a reproduced signal $Y_{k-3}$ to a reproduced signal $Y_k$ and corresponding expected values on each of the path A and the path B from time k-3 to time k, it is determined whether the transition sequence of the path A or the path B is probable.

The value of the sum of squares of differences between a reproduced signal $y_{k-3}$ to a reproduced signal $y_k$ and corresponding expected values on the path A from time k-3 to time k, is represented by Pa. Pa is represented by:

$$Pa=(y_{k-3}-4)^2+(y_{k-2}-3)^2+(y_{k-1}-1)^2+(y_k-0)^2 \quad \text{(Expression 2)}$$

The value of the sum of squares of differences between a reproduced signal $y_{k-3}$ to a reproduced signal $y_k$ and corresponding expected values on the path B from time k-3 to time k, is represented by Pb. Pb is represented by:

$$Pb=(y_{k-3}-5)^2+(y_{k-2}-5)^2+(y_{k-1}-3)^2+(y_k-1)^2 \quad \text{(Expression 3)}$$

Hereinafter, the meaning of the difference Pa and Pb (i.e., Pa−Pb) will be described where Pa and Pb indicate the reliability of the result of maximum likelihood decoding. A maximum likelihood decoding section selects the path A with high confidence if Pa<<Pb, and the path B if Pa>>Pb. If Pa=Pb, either the path A or the path B is selected. In this case, the chance that the decoding result is true is fifty-fifty. Thus, a distribution of Pa−Pb is obtained based on a predetermined time or a predetermined number of times and the decoding result.

Figure 3A:
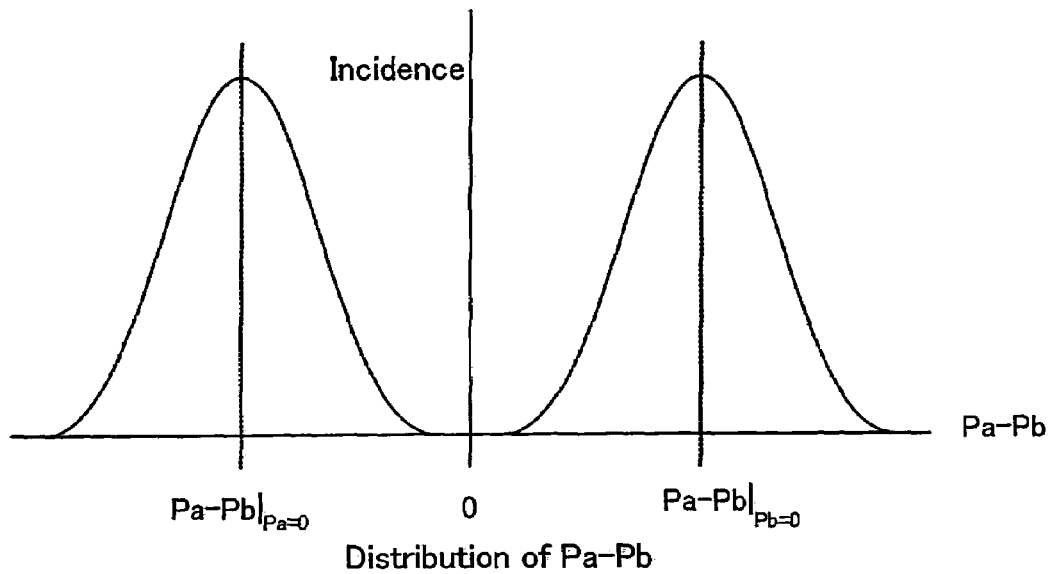
FIGS. 3A and 3B show distributions of Pa—Pb.
Figure 3B:
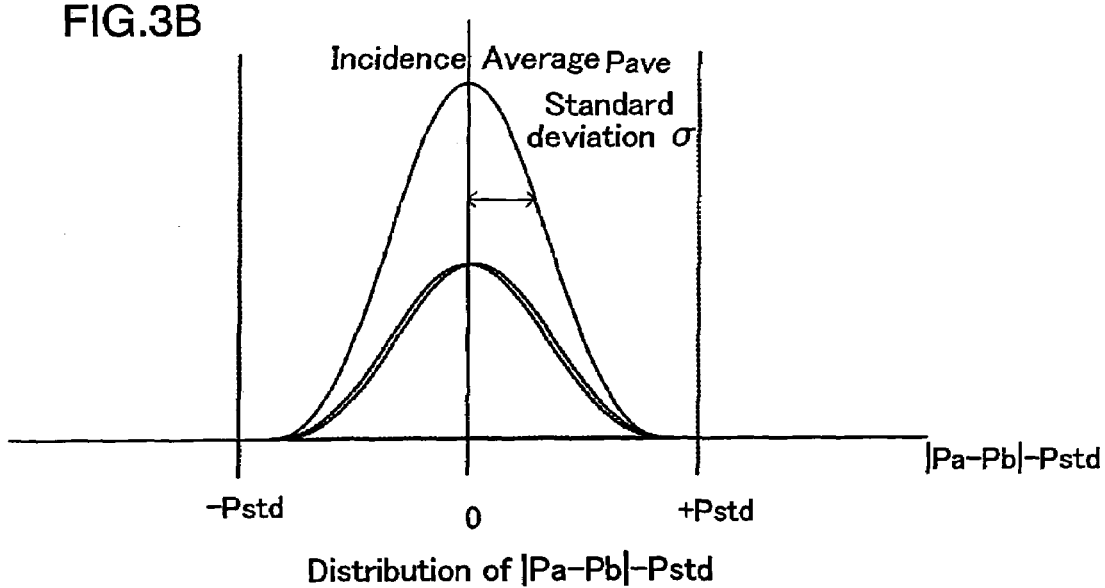

FIGS. 3A and 3B show distributions of Pa−Pb.

FIG. 3A shows a distribution of Pa−Pb when noise is added to a reproduced signal. The distribution has two peaks. One of the peaks indicates a maximum incidence when Pa=0, while the other indicates another maximum incidence when Pb=0. The value of Pa−Pb when Pa=0 is represented by −Pstd, while the value of Pa−Pb when Pb=0 is represented by Pstd. The absolute value of Pa−Pb is calculated and |Pa−Pb|−Pstd is obtained.

FIG. 3B shows a distribution of |Pa−Pb|−Pstd. The standard deviation σ and the average Pave of the distribution of FIG. 3B are calculated. It is assumed that the distribution of FIG. 3B is a normal distribution. For example, it is also assumed that error occurs when the value of |Pa−Pb|, which is the reliability of a decoding result is equal to or less than −Pstd. An error probability based on P(σ, Pave) is represented by:

$$P(\sigma, Pave)=\text{erfc}((Pstd+Pave)/\sigma). \quad \text{(Expression 4)}$$

The error rate of a binary signal indicating the result of maximum likelihood decoding can be predicted based on the average Pave and the standard deviation σ of the distribution of Pa−Pb. In other words, the average Pave and the standard deviation σ can be used as indexes for the quality of a reproduced signal.

In the above example, the distribution of |Pa−Pb| is assumed to be a normal distribution. In the case where the distribution is not a normal distribution, the number of times that the value of |Pa−Pb|−Pstd is less than or equal to a predetermined reference value is counted. The obtained number of counts can be an index of the quality of the reproduced signal.

In the case of the state transition rule defined by the recording code having a minimum polarity reversal interval of 2 and the equalization system PR (1, 2, 2, 1), there are two possible state transition paths in the following number of state transition patterns: 8 patterns from time k-4 to time k; 8 patterns from time k-5 to time k; and 8 patterns from time k-6 to time k. In a wider range of detection, there are Pa−Pb patterns, where Pa−Pb is the level of reliability.

Among a number of patterns, there are a number of patterns which are insensitive to a change in a recording parameter (e.g., a write power, an erase power, etc.). For example, such a pattern is a path involved in a change in a space for a long mark or a mark portion. By selecting only a pattern, which responds sensitively to a recording parameter, except for the above-described pattern, it is possible to detect a change in a reproduced waveform with respect to a change in a recording parameter (a recording power) with high precision. A pattern highly sensitive to the recording parameter is shown in Table 2.

TABLE 2

| | Patterns in which there can be two shortest state transition paths | |
|---|---|---|
| | | Reliability of decoding result (Pa − Pb) |
| State transition | Pa = 0 | Pb = 0 |
| $S2_{k-4} \to S0_k$ | −10 | +10 |
| $S3_{k-4} \to S0_k$ | −10 | +10 |
| $S2_{k-4} \to S1_k$ | −10 | +10 |
| $S3_{k-4} \to S1_k$ | −10 | +10 |
| $S0_{k-4} \to S4_k$ | −10 | +10 |
| $S5_{k-4} \to S4_k$ | −10 | +10 |
| $S0_{k-4} \to S3_k$ | −10 | +10 |
| $S5_{k-4} \to S3_k$ | −10 | +10 |

Specifically, a pattern group in Table 2 is involved in a transition waveform from a mark to a space or a space to a mark. For example, portions which respond sensitively to the power of a recording leading pulse (write power), the power of a cooling pulse (bottom power), or the ratio of a write power/an erase power, are grouped.

It is preferable to use the reliability Pa−Pb as an index of the quality of the reproduced signal. In this case, it is not necessary to detect all the patterns. By only detecting a pattern(s) having a high error probability, such a detection result can be used as an index which is correlated with the error probability. A pattern having a high error probability is a pattern having a small value of reliability Pa−Pb. There are 8 such patterns, where Pa−Pb=±10. These 8 patterns and Pa−Pb are summarized in Table 2 above.

Further, |Pa−Pb|−Pstd is calculated. A standard deviation $\sigma_{10}$ and an average $Pave_{10}$ are calculated from the distribution. As described with reference to FIG. 3B, if the distribution is assumed to be a normal distribution, a probability $P_{10}$ of occurrence of error is represented by:

$$P_{10}(\sigma_{10}, Pave_{10})=\text{erfc}((10+Pave_{10})/\sigma_{10}). \quad \text{(Expression 5)}$$

In the above-mentioned 8 patterns, a 1-bit shift error occurs. In the other patterns, a 2- or more bit shift error occurs. A result of analysis of post-PRML processing error patterns shows that most of the errors are 1-bit shift errors. Therefore, the error probability of the reproduced signal can be estimated by expression 6. In this manner, the standard deviation $\sigma_{10}$ and the average value $Pave_{10}$ can be used as an index of the quality of the reproduced signal. For example, the following expression can be defined, assuming that the above-described index is a PRML error index M:

$$M=\sigma 10/(2 \cdot d_{min}^2)[\%] \quad \text{(Expression 6)}$$

where $d_{min}^2$ is the square of a minimum value of a Euclid distance, which is equal to 10 when a modulation code having a minimum polarity reversal interval of 2 and the PR (1, 2, 2, 1) ML system are combined. In other words, $d_{min}^2=10=Pstd$. Note that the average $Pave_{10}$ in expression 5 is assumed to be 0 and is not taken into account when the index of expression 6 is calculated. Based on the relationship between expressions 5 and 6, the error rate after PRML processing can be predicted using the index M.

Thus, by detecting a state, which is recorded using a metric expected value error of only a state transition pattern (a pattern with the minimum Euclid distance) involved in the vicinity of an edge of a reproduced waveform among a number of state transition patterns in the PRML algorithm, the index M can be detected with high precision irrespective of variations in the power of a recording leading pulse (write power), the power of a cooling pulse (bottom power), or the ratio of a write power/an erase power.

2. Embodiment 1

2-1. Recording/Reproduction Apparatus of Embodiment 1

Figure 4:
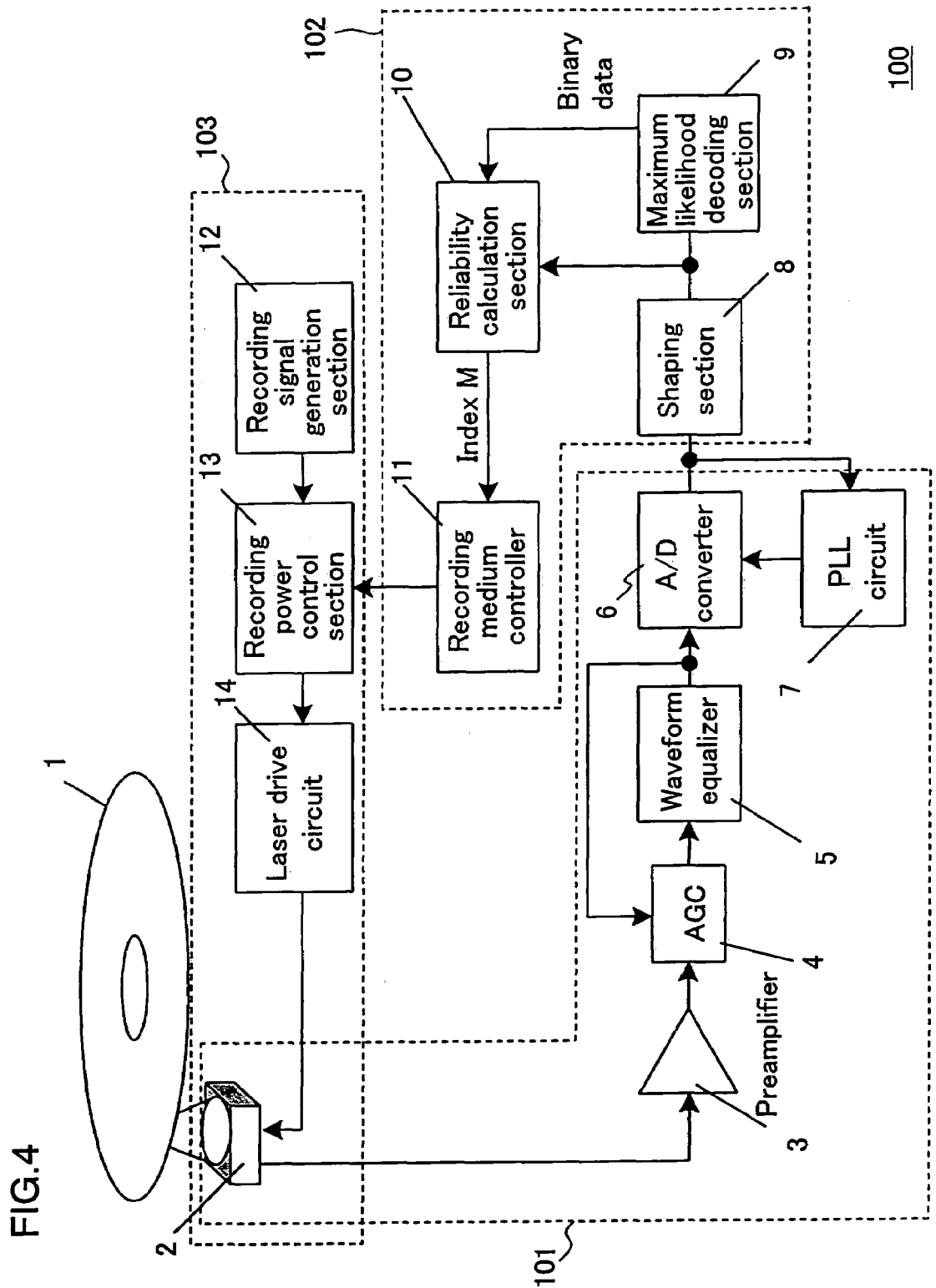
FIG. 4 is a diagram showing a recording/reproduction apparatus according to an example of the present invention.

FIG. 4 shows a recording/reproduction apparatus 100 according to an example of the present invention. The recording/reproduction apparatus 100 includes a reproduction section 101, a recording control device 102, and a recording section 103. On the recording/reproduction apparatus 100, a recording medium 1 can be mounted. A recording medium 1 is used for optical information recording and reproduction, and is, for example, an optical disc.

The reproduction section 101 includes an optical head section 2, a preamplifier 3, an AGC 4, a waveform equalizer 5, an A/D converter 6, and a PLL circuit 7. The reproduction section 101 generates a digital signal from an analog signal representing information reproduced from the recording medium 1.

The recording control section 102 includes a shaping section 8, a maximum likelihood decoding section 9, a reliability calculation section 10, and a recording medium controller 11. The recording control section 102 is produced as, for example, a semiconductor chip.

The shaping section 8 is, for example, a digital filter, and receives a digital signal generated by the reproduction section 101 and shapes the waveform of the digital signal such that the digital signal has a predetermined equalizing characteristic.

The maximum likelihood decoding section 9 is, for example, a Veterbi decoding circuit, and performs maximum likelihood decoding of the digital signal having the waveform thereof shaped by the shaping section 8 and generates a binary signal representing the result of the maximum likelihood decoding.

The reliability calculation section 10 is, for example, a differential metric detection circuit, and calculates the reliability of the result of maximum likelihood decoding based on the digital signal having the waveform thereof shaped by the shaping section 8 and the binary signal output from the maximum likelihood decoding section 9.

The recording medium controller 11 adjusts a recording power for recording information onto the recording medium 1 based on a reliability calculated by the reliability calculation section 10. For example, the recording power to be adjusted includes at least one of a write power, an erase power, and a bottom power. The recording medium controller 11 adjusts the shape of a recording signal in a manner which allows the result of maximum likelihood decoding to have a higher level of reliability. The recording medium controller 11 is, for example, an optical disc controller.

The recording section 103 includes a recording signal generation section 12, a recording power control section 13, a laser drive circuit 14, and an optical head 2. The recording section 103 records information onto the recording medium 1 based on the result of adjustment of a recording power.

In this example, the optical head 2 is shared by the reproduction section 101 and the recording section 103, and functions as both a recording head and a reproduction head. The recording head and the reproduction head may be separately provided.

Hereinafter, an operation of the recording/reproduction apparatus 100 will be described in detail with reference to FIG. 4.

The optical head section 2 generates an analog reproduced signal representing information which is read from the recording medium 1. The analog reproduced signal is amplified and AC-coupled by the preamplifier 3 and then is input to the AGC 4. The AGC 4 adjusts the gain of the analog reproduced signal such that the output from the waveform equalizer 5, which will later process the signal, has a constant amplitude. The analog reproduced signal which is output from the AGC 4 has the waveform thereof shaped by the waveform equalizer 5. The resultant analog reproduced signal is output to the A/D converter 6. The A/D converter 6 samples the analog reproduced signal in synchronization with a reproduction clock which is output from the PLL circuit 7. The PLL circuit 7 extracts the reproduction clock from a digital reproduced signal obtained by sampling performed by the A/D converter 6.

The digital reproduced signal generated by sampling performed by the A/D converter 6 is input to the shaping section 8. The shaping section 8 adjusts the frequency characteristics of the digital reproduced signal (i.e., adjusts the waveform of the digital reproduced signal), such that the frequency characteristics of the digital reproduced signal are the characteristics assumed by the maximum likelihood decoding section 9 (in this example, PR (1, 2, 2, 1) equalization characteristics) at the time of recording and reproduction.

The maximum likelihood decoding section 9 performs maximum likelihood decoding of the digital reproduced signal having the waveform thereof shaped by the shaping section 8, and thus generates at least one binary signal. The at least one binary signal indicates the result of maximum likelihood decoding.

The reliability calculation section 10 receives at least one digital reproduced signal having the waveform thereof shaped by the shaping section 8 and at least one binary signal. The reliability calculation section 10 identifies state transition from the binary signal, and the index M based on the identification result and a branch metric.

The recording medium controller 11 controls a recording power learning procedure. In the procedure, recording power parameters are set for test recording, a recording operation is controlled, a reproduction operation is controlled, an index M is calculated for each recording power, and a recording power is determined so that the index M is optimized. The details of the recording power learning procedure will be described below.

The recording power control section 13 generates a laser light waveform based on a recording power parameter output from the recording medium controller 11 and a recording test pattern output from the recording signal generation section 12. The laser drive circuit 14 drives the optical head 2 to emit laser in accordance with the laser light pattern.

By using the recording/reproduction apparatus 100, it is possible to establish an optimum write power, an erase power and a bottom power, which minimize error during reproduction.

2-2. Recording/Reproduction Method of Embodiment 1

Figure 5:
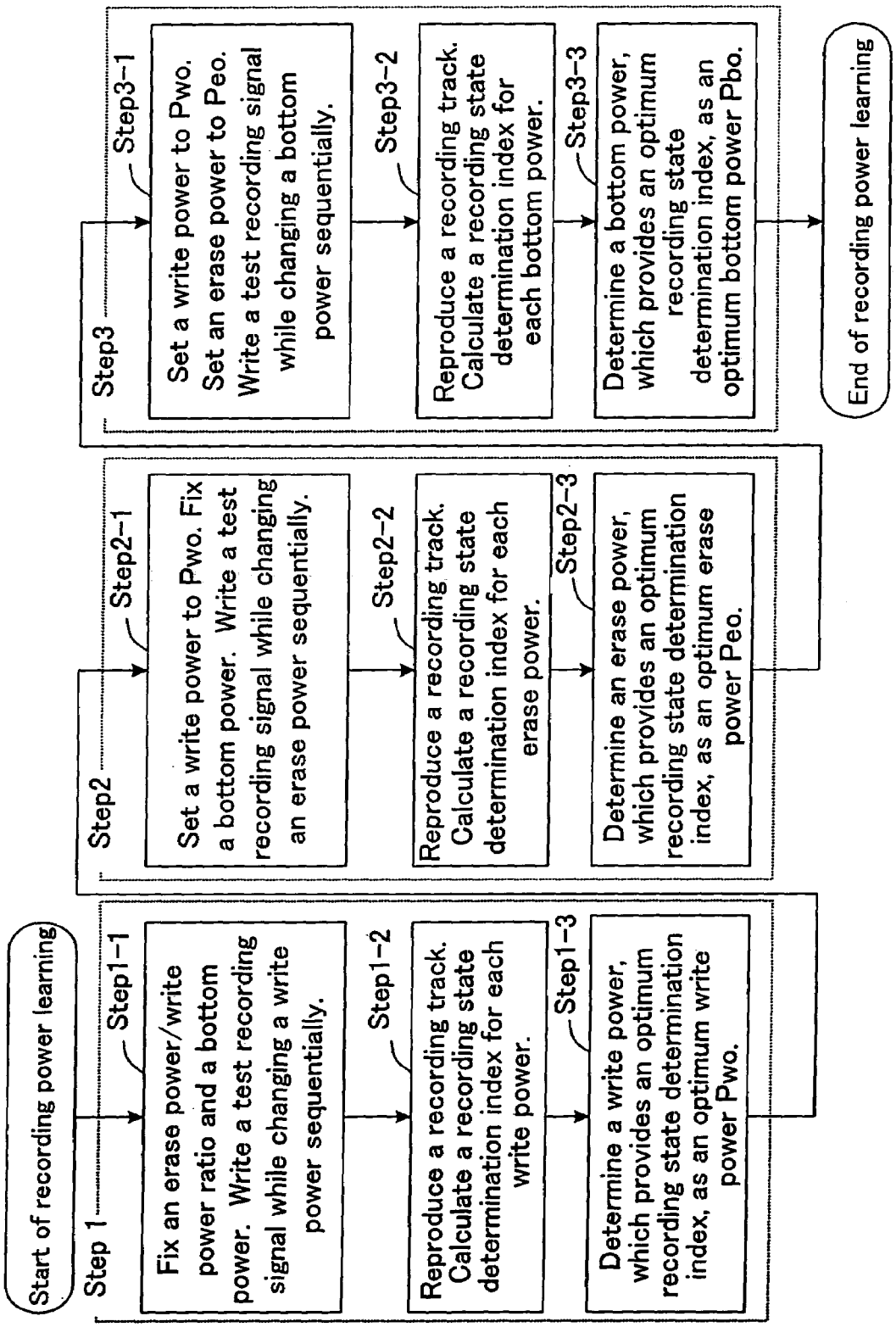
FIG. 5 is a diagram showing a recording power learning procedure according to Embodiment 1 of the present invention.

FIG. 5 shows a recording power learning procedure according to Embodiment 1 of the present invention. The recording/reproduction apparatus 100 performs the recording power learning procedure to adjust a recording power. The recording power learning procedure comprises steps 1 to 3.

Hereinafter, the recording power learning procedure will be described step by step with reference to FIG. 5.

When the recording power learning is started, an optimum write power Pwo is calculated in step 1. Step 1 includes steps 1-1, 1-2 and 1-3.

Step 1-1: The optical head 2 is controlled to be shifted into a predetermined learning area on the recording medium 1. An erase power/write power ratio (Pe/Pw) and a bottom power are fixed. A test recording signal is written while changing a write power sequentially. In this case, the erase power/write power ratio and the bottom power may be fixed to recommended values previously recorded on the recording medium 1, which are defined in accordance with a standard or the like, as initial values. The write power may be changed around a recommended value previously recorded on the recording medium 1.

Alternatively, recommended values which the recording/reproduction apparatus 100 stores for each recording medium may be used as initial values. For example, it is assumed that the recommended values previously recorded on the recording medium 1 are Pw=9.0 [mW], Pe/Pw=0.40, and Pb=0.3 [mW]. In this case, Pe/Pw and Pb are fixed to 0.40 and 0.3, respectively. While Pw is changed from 8.0 to 10.0 [mW] by 0.2 [mW], the same test recording signal is repeatedly recorded for each write power.

After test recording, the procedure goes to step 1-2.

Step 1-2: The optical head 2 reproduces the recorded test recording signal. The reliability calculation section 10 calculates a recorded state determination index value for each write power. As described above (1. Index M), the present invention is characterized in that a metric expected value error (hereinafter referred to as an index M) of the PRML technique extracted from state transition corresponding to the vicinity of an edge of a reproduced waveform is used as a recorded state determination index value. Features of the index M are that the index M is correlated with an error rate in a transmission path which employs the PRML technique for processing of a reproduced signal, that the index M can be detected with high sensitivity to the asymmetry of a waveform due to a change in power, and the like.

After the reliability calculation section 10 calculates a recorded state determination index value for each write power, the procedure goes to step 1-3.

Step 1-3: the reliability calculation section 10 determines a write power, which allows an optimum index M, as an optimum write power Pwo. For example, the reliability calculation section 10 selects a minimum value as an optimum index M, and determines a write power corresponding to the selected index M as an optimum write power Pwo.

Figure 6:
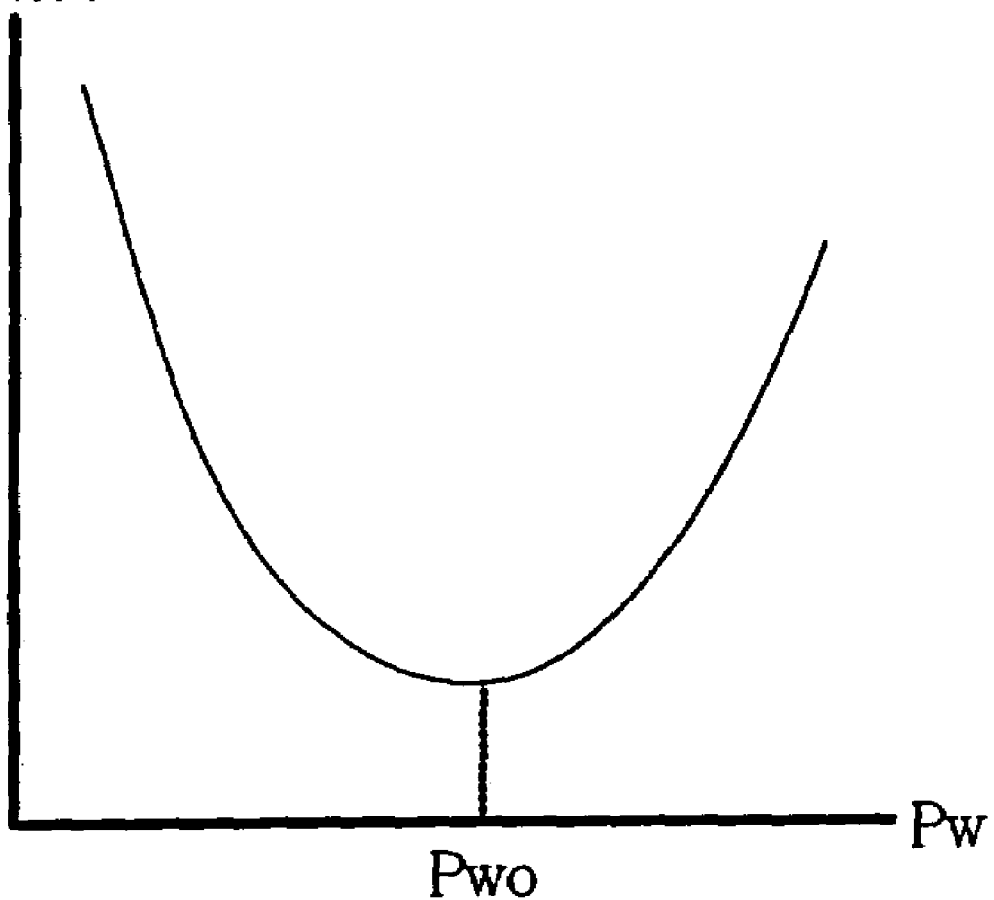
FIG. 6 is a diagram showing a plot of an index M for each write power and determination of an optimum write power Pwo.

For example, FIG. 6 shows a plot of an index M for each write power and determination of an optimum write power Pwo.

Figure 7:
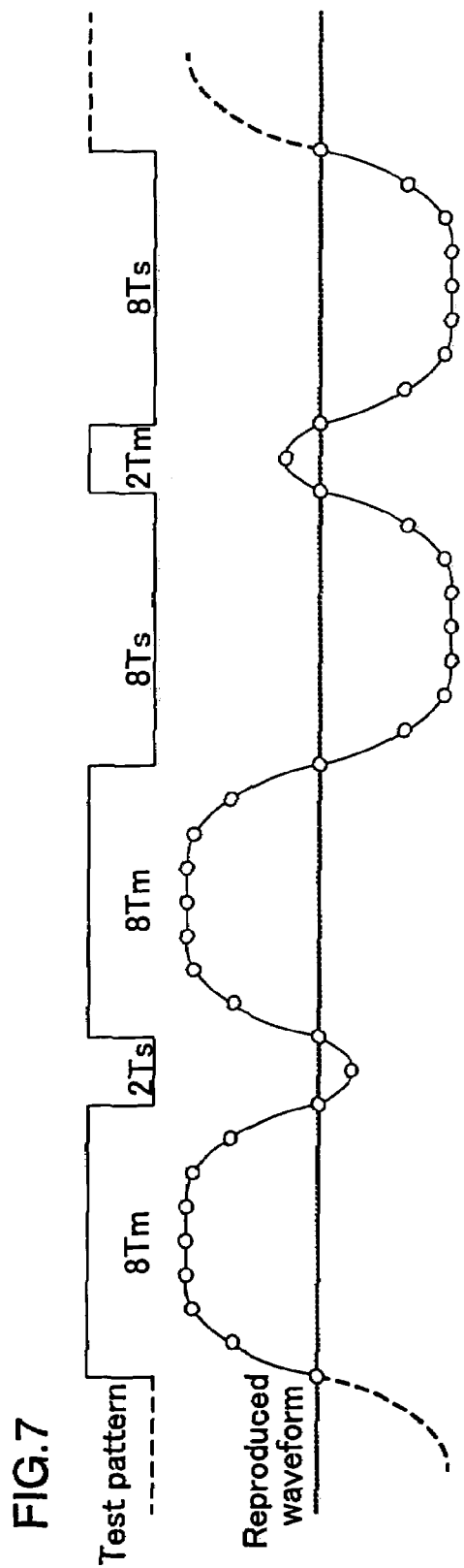
FIG. 7 is a diagram showing a test pattern and a waveform when a pattern is reproduced.

FIG. 7 shows a test pattern and a waveform when the pattern is reproduced. Open circles on the reproduced waveform indicate sampling points obtained by the A/D converter 6. The present invention is also characterized by the test recording signal. Conventionally, a single pattern having a predetermined cycle is used as a test pattern for recording power learning. For example, such a single pattern is a repeat pattern of 6T (T is a channel cycle). The single pattern resists influences of width or phase shift of a recording pulse for each recording mark length. However, a change in waveform corresponding to a change in recording power may be detected with less precision. In the present invention, in a recording modulation rule, a minimum mark length and a maximum mark length are combined, and a test pattern in which a recorded portion (mark) and an unrecorded portion (space) occur with the same probability is used. For example, when the (1, 7) Run Length Limited code is used as a recording modulation code, the minimum mark length is 2T and the maximum mark length is 8T, a repeat pattern of 8Tm2Ts8Tm8Ts2Tm8Ts is used. Tm indicates a channel cycle length of marks and Ts indicates a channel cycle length of spaces.

Thus, in step 1, a write power which allows an optimum index M, is determined as an optimum write power Pwo.

Thereafter, in step 2, an optimum erase power Peo is obtained. Step 2 includes steps 2-1, 2-2 and 2-3.

In step 2-1: The recording medium controller 11 sets a write power to the optimum write power Pwo determined in step 1. Further, the recording medium controller 11 fixes a bottom power, and writes a test recording signal (test recording) while changing an erase power sequentially.

For example, Pw and Pb are fixed to 9.4 [mW] (Pwo) and 0.3 [mW], respectively. While Pe is changed from 3.4 to 4.1 [mW] by 0.1 [mW] where the center is Pe=Pw*0.4=3.76 [mW], the same test recording signal is repeatedly recorded for each write power. The recording can be performed by overwriting a track having a previously recorded state. Alternatively, the same track as that used in step 1 can be used.

After writing of a test recording signal (test recording) is ended, the procedure goes to step 2-2.

Step 2-2: The optical head 2 reproduces the recorded test recording signal. The reliability calculation section 10 calculates a recorded state determination index value (index M) for each erase power.

The index M is used as a recorded state determination index as in step 1. A repeat pattern of 8Tm2Ts8Tm8Ts2Tm8Ts is used as a test recording signal.

After the reliability calculation section 10 calculates a recorded state determination index value for each erase power, the procedure goes to step 2-3.

Step 2-3: The reliability calculation section 10 determines an erase power, which allows an optimum index M, as an optimum erase power Peo. The reliability calculation section 10 selects, for example, a minimum value as the optimum index M, and an erase power corresponding to the selected index M as an optimum erase power Peo.

Figure 8:
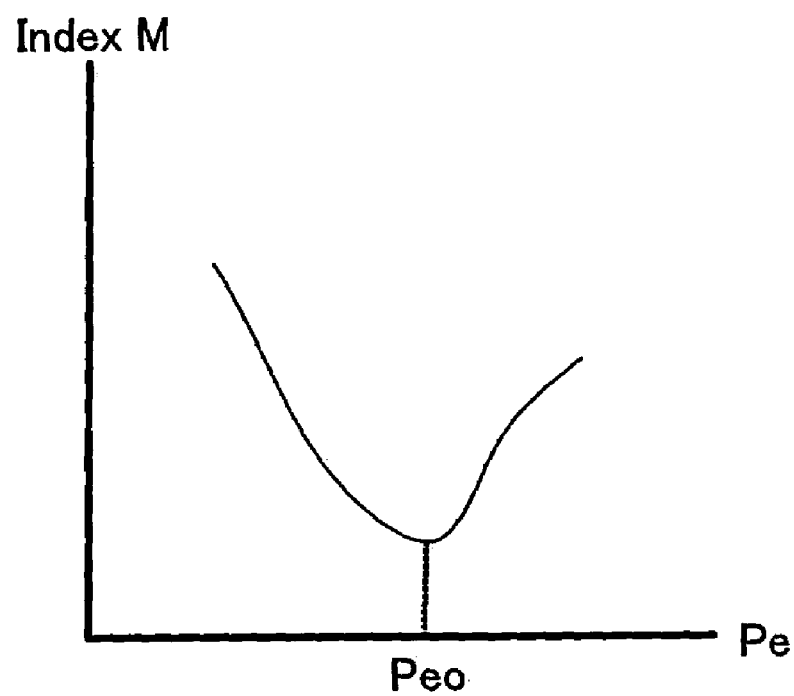
FIG. 8 is a diagram showing a plot of an index M for each erase power and determination of an optimum erase power Peo.

For example, FIG. 8 shows a plot of an index M for each erase power and determination of an optimum erase power Peo.

Thereafter, in step 3, an optimum bottom power Pbo is calculated. Step 3 includes steps 3-1, 3-2 and 3-3.

Step 3-1: The recording medium controller 11 sets a write power to the optimum write power Pwo determined in step 1. The recording medium controller 11 sets an erase power to the optimum erase power Peo determined in step 2. Further, the recording medium controller 11 writes a test recording signal while changing a bottom power sequentially (test recording).

For example, Pw and Pe are fixed to Pwo=9.4 [mW] and Peo=3.9 [mW], respectively. While Pb is changed from 0.2 to 0.4 [mW] by 0.05 [mW], the same test recording signal is repeatedly recorded for each write power. The recording can be performed by overwriting a track having a previously recorded state. Alternatively, the same track as that used in steps 1 and 2 can be used for recording.

After writing of a test recording signal (test recording) is ended, the procedure goes to step 3-2.

Step 3-2: The optical head 2 reproduces the recorded test recording signal. The reliability calculation section 10 calculates a recorded state determination index value (index M) for each bottom power. The index M is used as a recorded state determination index as in steps 1 and 2. A repeat pattern of 8Tm2Ts8Tm8Ts2Tm8Ts is used as a test recording signal.

After the reliability calculation section 10 calculates a recorded state determination index value for each bottom power, the procedure goes to step 3-3.

Step 3-3: the reliability calculation section 10 determines a bottom power obtained from an optimum index M as an optimum bottom power Pbo. The reliability calculation section 10 selects a minimum value as the optimum index M and determines a bottom power corresponding to the selected index M as an optimum bottom power Pbo.

Figure 9:
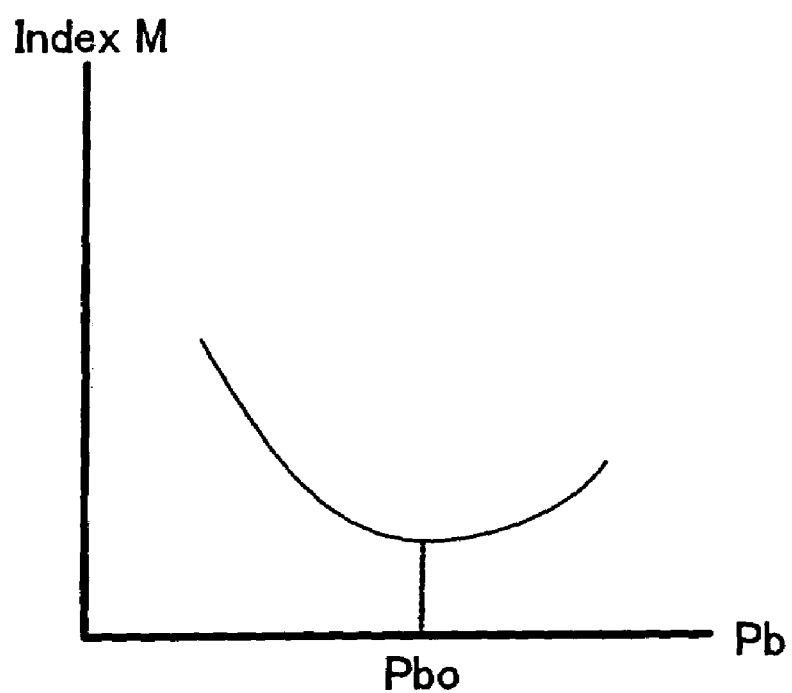
FIG. 9 is a diagram showing a plot of an index M for each bottom power and determination of an optimum bottom power Pbo.

For example, FIG. 9 shows a plot of an index M for each bottom power and determination of an optimum bottom power Pbo.

As described above, by performing steps 1 to 3, the learning procedure for establishing an optimum write power, erase power and bottom power is ended and recording can be performed with minimum error during reproduction. Note that when a change in bottom power has substantially no influence on readability during reproduction, learning in step 3 may be omitted and a bottom power may be set to an appropriate fixed value.

As described above, in Embodiment 1 of the present invention, by detecting a state, which is recorded using a metric expected value error of only a state transition pattern (a pattern with the minimum Euclid distance) involved in the vicinity of an edge of a reproduced waveform among a number of state transition patterns in the PRML algorithm, a recorded waveform changed corresponding to variations in the power of a recording leading pulse (write power), the power of a cooling pulse (bottom power), or the ratio of a write power/an erase power, can be detected with high precision. A repeat pattern of 8Tm2Ts8Tm8Ts2Tm8Ts is used as a test pattern, taking into account that it resists the influence of the width or phase shift of a recording pulse for each recording mark length, that a change in waveform corresponding to a change in recording power is detected with high sensitivity, and the like. As a result, the detection sensitivity can be further improved.

3. Embodiment 2

3-1. Recording/Reproduction Apparatus of Embodiment 2

Figure 10:
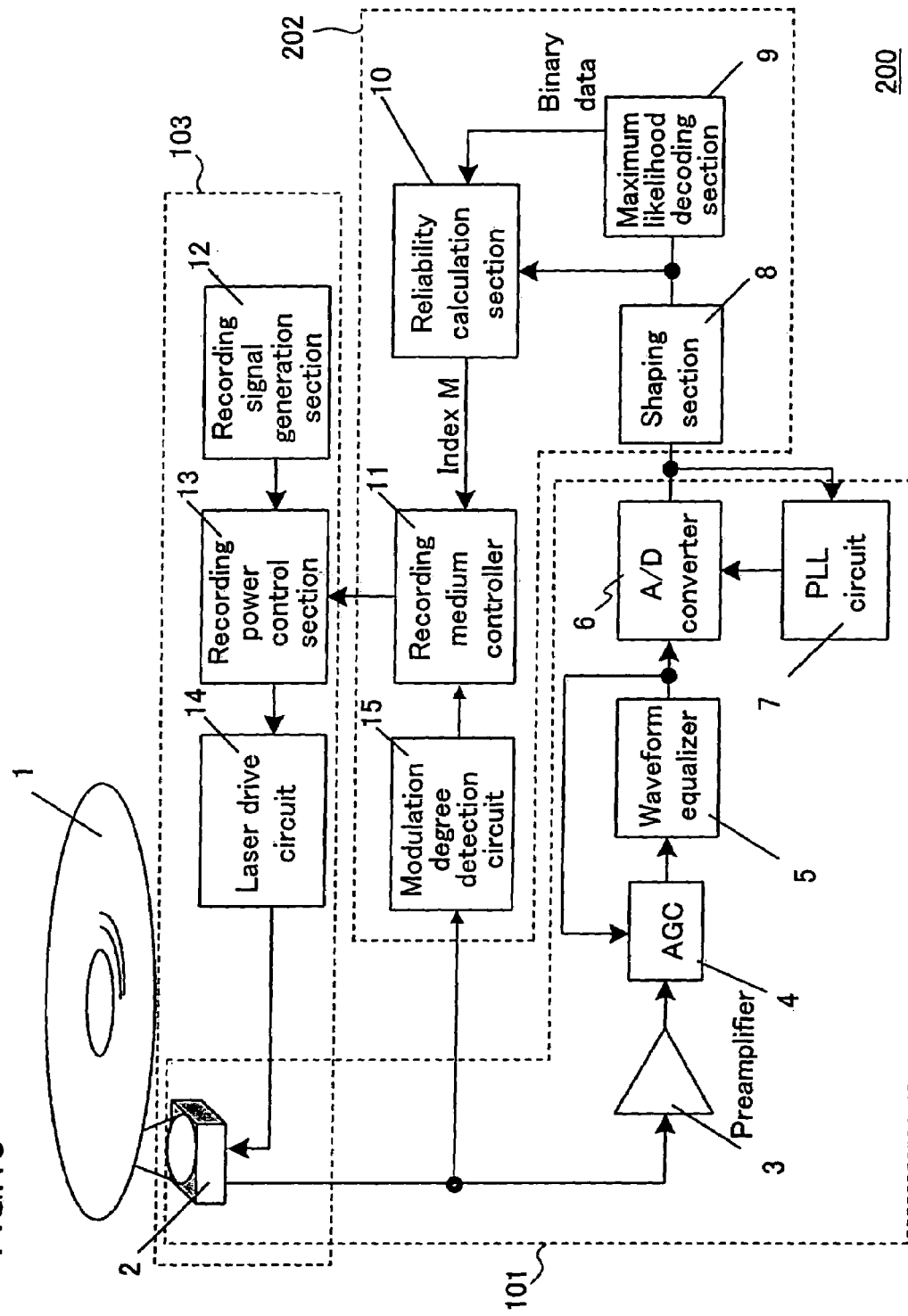
FIG. 10 is a diagram showing a recording/reproduction apparatus according to Embodiment 2 of the present invention.

FIG. 10 shows a recording/reproduction apparatus 200 according to Embodiment 2 of the present invention. The recording/reproduction apparatus 200 comprises a recording control device 202 instead of the recording control device 102 of the recording/reproduction apparatus 100 according to Embodiment 1 of the present invention, which is described with reference to FIG. 4. Therefore, in FIG. 10, the same parts as those of the recording/reproduction apparatus 100 of FIG. 4 are referenced with the same reference numerals and will not be explained.

The recording control device 202 comprises a shaping section 8, a maximum likelihood decoding section 9, a reliability calculation section 10, a recording medium controller 11, and the modulation degree detection circuit 15. The recording control device 202 is produced as, for example, a semiconductor chip.

The modulation degree detection circuit 15 calculates modulation degree characteristics based on an amplitude of a reproduced signal read from the optical head section 2, and outputs the modulation degree characteristics to the recording medium controller 11.

The recording medium controller 11 adjusts a recording power for recording information onto a recording medium 1 based on at least one of reliability and modulation degree characteristics.

As described above, the recording/reproduction apparatus 200 establishes an optimum write power, erase power and bottom power which allow minimum error during reproduction.

3-2. Recording/Reproduction Method of Embodiment 2

Hereinafter, a recording power learning procedure according to Embodiment 2 of the present invention will be described with reference to FIG. 5. The recording/reproduction apparatus 200 performs a recording power learning procedure to adjust a recording power.

In Embodiment 2 of the present invention, the same steps as those in Embodiment 1 will not be explained. As in Embodiment 1, the recording power learning procedure of Embodiment 2 comprises steps 1 to 3. In the step of calculating an optimum write power Pwo (step 1), the degree of modulation is used as a recorded state determination index value, as is different from Embodiment 1. The details of the step of calculating an optimum write power Pwo based on the degree of modulation will be described below.

In step 1, the degree of modulation is obtained for each of setting of a recording power parameter for test recording, control of a recording operation, control of a reproduction operation, and a recording power. The reliability calculation section 10 determines an optimum write power Pwo based on the calculated degree of modulation.

Similarly, in steps 2 and 3, an index M is obtained for each of setting of a recording power parameter for test recording, control of a recording operation, control of a reproduction operation, and a recording power. The reliability calculation section 10 determines an optimum erase power Peo and an optimum bottom power Pbo based on the index M.

Hereinafter, the step of determining an optimum write power Pwo based on the degree of modulation will be described.

The degree of modulation is an index indicating the size of an amplitude of a reproduced signal. The degree of modulation MOD is defined based on expression 7.

$$MOD = (Itop - Ibtm)/(Itop - Ith) \quad \text{(Expression 7)}$$

Figure 11:
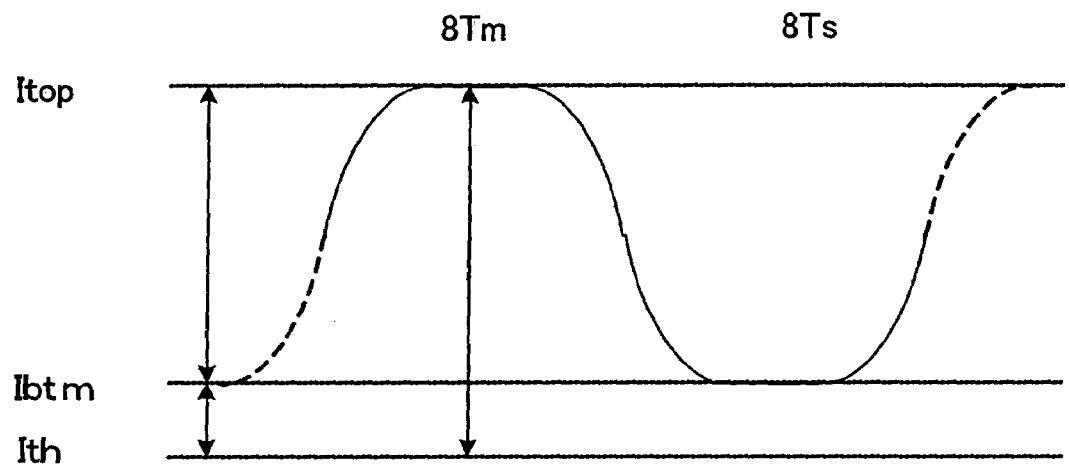
FIG. 11 is a diagram for explaining a relationship among Itop, Ibtm and Ith.

FIG. 11 is a diagram for explaining a relationship among Itop, Ibtm and Ith.

Hereinafter, Itop, Ibtm and Ith contained in expression 7 will be described with reference to FIG. 11.

Itop indicates a highest reflection level of a reproduced signal. Ibtm indicates a lowest reflection level of a reproduced signal. Ith indicates a level of laser erase light. In this embodiment, the degree of modulation is used to obtain an 8T-repeat signal. The present invention is not limited to this.

Figure 12:
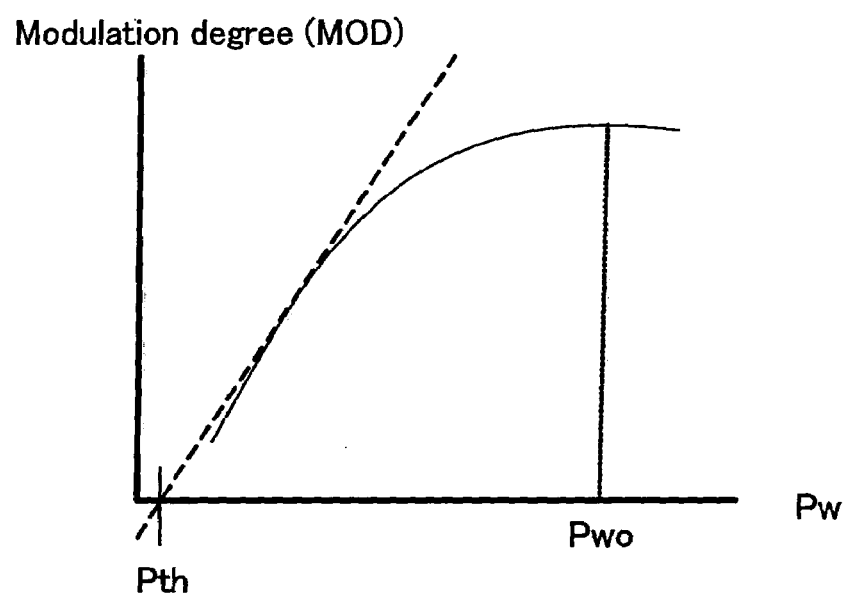
FIG. 12 is a diagram showing a relationship between the degree of modulation MOD and a write power Pw.

FIG. 12 shows a relationship between the degree of modulation MOD and a write power Pw.

The degree of modulation MOD varies depending on the write power Pw. When the write power Pw is low, the amplitude of a reproduced signal is low, so that the degree of modulation MOD is small. As the write power Pw is increased, the amplitude of a reproduced signal is increased, so that the degree of modulation MOD is increased. When the write power Pw is increased to a predetermined extent, the degree of modulation MOD is saturated.

A tangent of a modulation degree curve is obtained with reference to a portion thereof in which the write power Pw is relatively low (several samples from a non-saturated portion). An intersection Pth between the tangent and the X axis is obtained (see FIG. 12). A coefficient ρ for obtaining an optimum write power Pwo from Pth is previously recorded on a disc or is stored in a recording/reproduction apparatus for each disc. The coefficient ρ is used to calculate an optimum write power Pwo in accordance with the following expression.

$$Pwo = \rho \times Pth \quad \text{(Expression 8)}$$

Thus, in step 1, the optimum write power Pwo is determined based on the modulation degree characteristics.

In steps 2 and 3, the step of determining an optimum erase power Peo and a bottom power Pbo is the same as that of Embodiment 1 and will not be explained. When a change in bottom power has substantially no influence on readability during reproduction, step 3 may be omitted and the bottom power may be fixed to an appropriate value.

In Embodiment 2, expression 8 is referenced when determining Pwo using the degree of modulation. The present invention is not limited to this. For example, a power with which a predetermined degree of modulation is detected may be regarded as Pwo. Alternatively, a power with which the degree of modulation is saturated may be regarded as Pwo.

In Embodiment 2, a test signal includes a repeat pattern of 8Tm8Ts. The present invention is not limited to this. A test signal only needs to contain a pattern in which the upper and lower amplitudes of a reproduced signal can be measured.

4. Embodiment 3

4-1. Recording/Reproduction Apparatus of Embodiment 3

Figure 13:
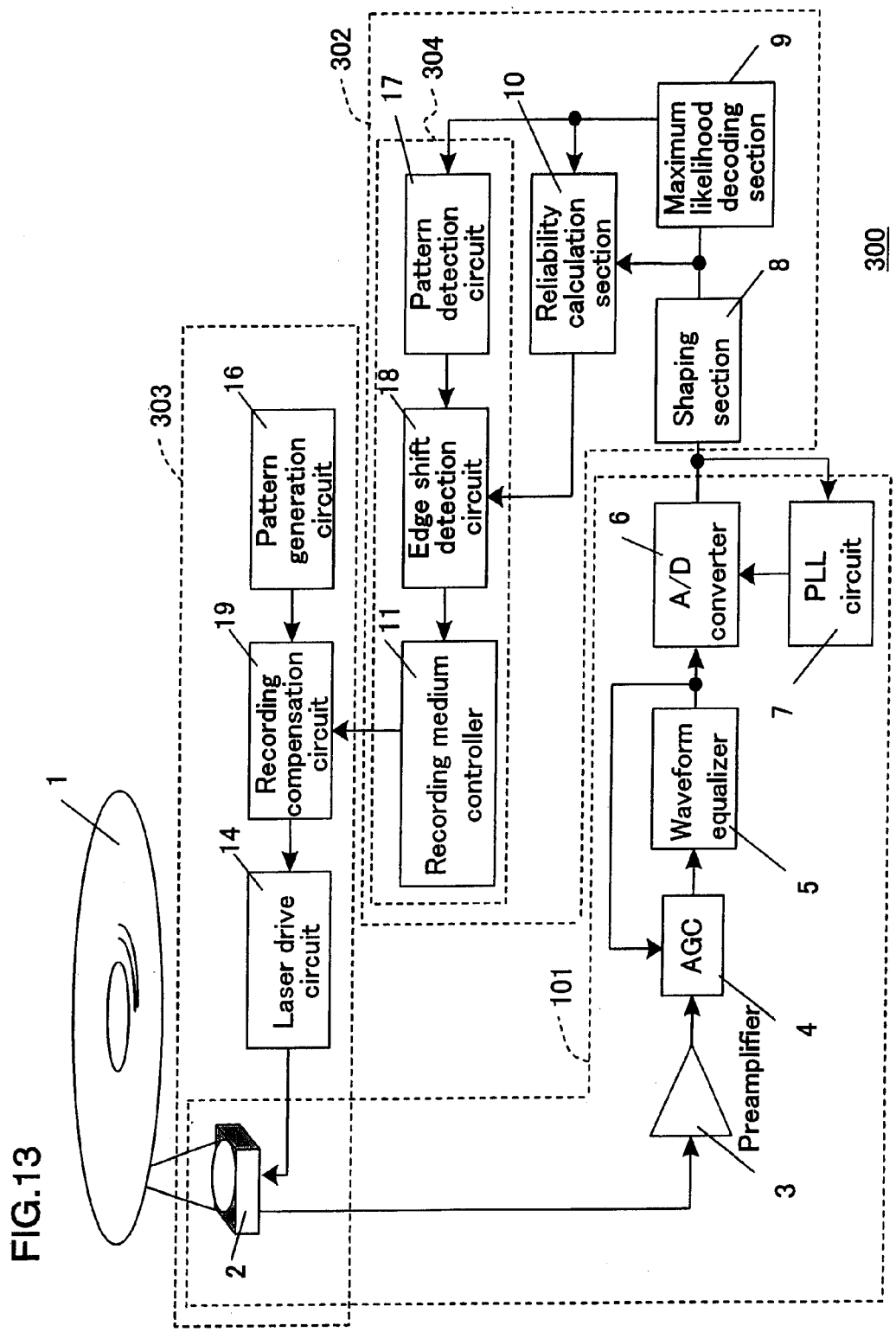
FIG. 13 is a diagram showing a recording/reproduction apparatus according to Embodiment 3 of the present invention.

FIG. 13 shows a recording/reproduction apparatus 300 according to Embodiment 3 of the present invention. The recording/reproduction apparatus 300 comprises a recording control device 302 instead of the recording control device 102 included in the recording/reproduction apparatus 100 of Embodiment 1 of the present invention, which is described with reference to FIG. 4, and a recording section 303 instead of the recording section 103 included in the recording/reproduction apparatus 100. Therefore, in FIG. 13, the same parts as those of the recording/reproduction apparatus 100 of FIG. 4 are referenced with the same reference numerals and will not be explained.

The recording control device 302 comprises a shaping section 8, a maximum likelihood decoding section 9, a reliability calculation section 10 and a control section 304 (a pattern detection circuit 17, an edge shift detection circuit 18, and a recording medium controller 11). The recording control device 302 is fabricated as, for example, a semiconductor chip.

The reliability calculation section 10 is, for example, a differential metric detection circuit, and calculates the reliability of the result of the maximum likelihood decoding based on the digital signal having the waveform thereof shaped by the shaping section 8 and the binary signal output from the maximum likelihood decoding section 9. In one embodiment of the present invention, the reliability calculation section 10 calculates the reliability of the result of the maximum likelihood decoding based on digital signals corresponding to a mark start edge and a mark termination edge of a recording mark formed on the recording medium 1 and binary signals.

The adjusting section 304 adjusts the shape of predetermined portions of a recording signal for recording information on the recording medium 1 based on the reliability calculated by the reliability calculation section 10. The adjusting section 304 adjusts, for example, the positions of edges of the recording signal. The adjustment of the shape of the recording signal by the adjusting section 104 is performed such that the reliability of the result of the maximum likelihood decoding is improved. The recording medium controller 11 is, for example, an optical disc controller.

The recording section 303 includes a pattern generation circuit 16, a recording compensation circuit 19, a laser driving circuit 14, and an optical head section 2. The recording section 303 records information on the recording medium 1 based on the adjusting result of the shape of the recording signal. In this example, the optical head section 2 is included both in the reproduction section 101 and the recording section 303, and functions as both a recording head and a reproduction head. The recording head and the reproduction head may be separately provided.

An operation of the recording/reproduction apparatus 300 will be described in detail below. The operation of the same parts as those of the recording/reproduction apparatus 100 will not be explained.

Based on the binary signal, the pattern detection circuit 17 generates a pulse signal for assigning the above-mentioned 8 patterns (Pattern-1 through Pattern-8) for each recording pattern, and outputs the pulse signal to the edge shift detection circuit 18.

The edge shift detection circuit 18 accumulatively adds the reliability Pabs pattern by pattern, and obtains a shift of the recording compensation parameter from the optimum value (i.e., an edge shift).

The recording medium controller 11 changes a recording parameter (the waveform of a recording signal) which it is determined that needs to be changed based on the edge shift amount for each pattern.

The pattern generation circuit 16 outputs a recording compensation leaning pattern.

Based on the recording parameter from the recording medium controller 11, the recording compensation circuit 19 generates a laser light waveform pattern in accordance with the recording compensation leaning pattern. In accordance with the resultant laser light waveform pattern, the laser driving circuit 14 controls a laser light emission operation of the optical head section 2.

Figure 14:
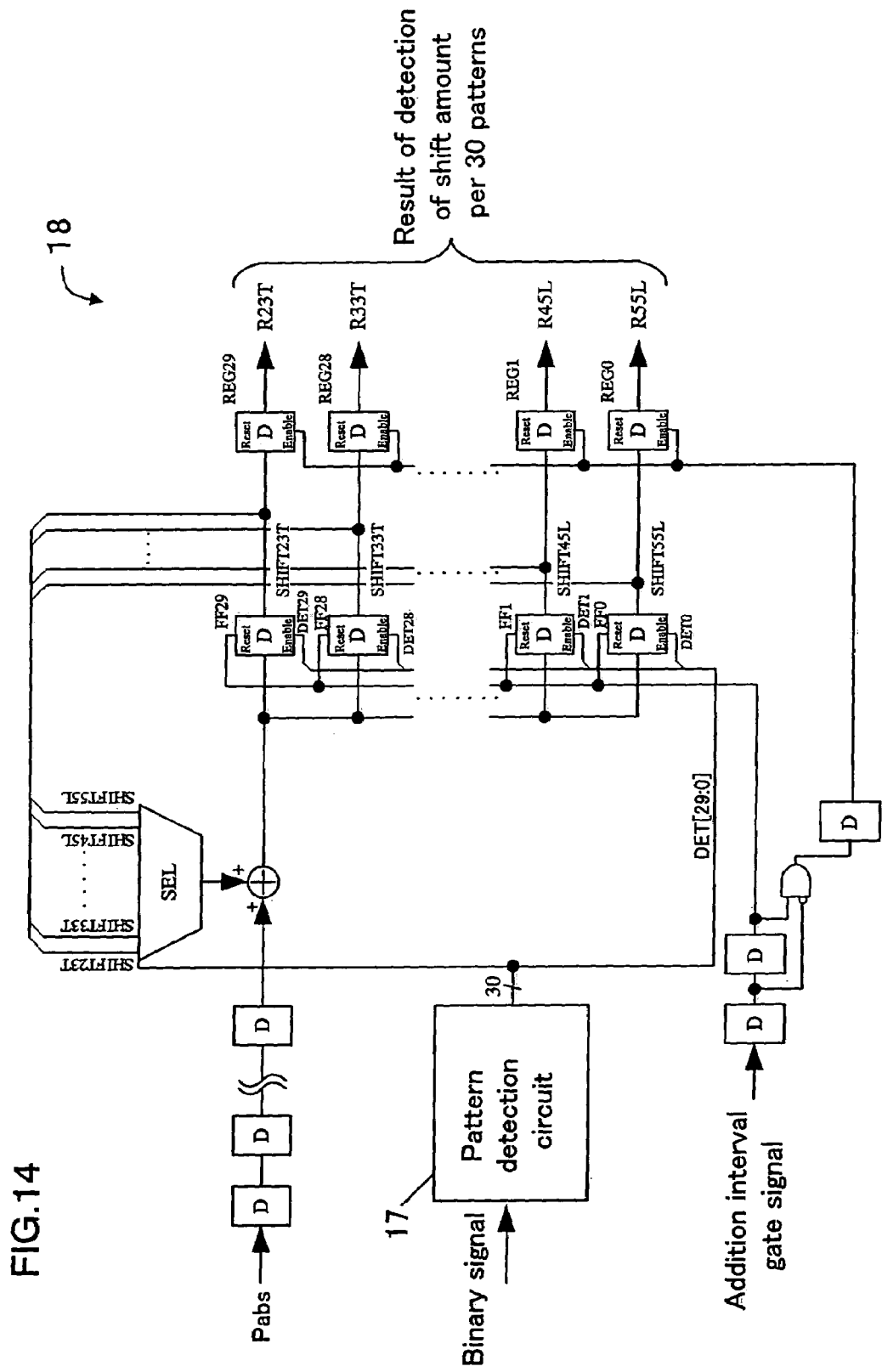
FIG. 14 is a diagram showing a pattern detection circuit and an edge shift detection circuit.

FIG. 14 shows the pattern detection circuit 17 and the edge shift detection circuit 18.

Hereinafter, an operation of the edge shift detection circuit 18 will be described in detail with reference to FIG. 14.

The edge shift detection circuit 18 receives a pattern detection result obtained by the pattern detection circuit 17 and the reliability Pabs calculated by the reliability calculation section 10. The reliability Pabs data input to the edge shift detection circuit 18 is delayed by a flip-flop (FF) in consideration of the delay caused by the pattern detection circuit 17. The reliability Pabs data corresponding to the pattern detection output and the detection output point are input to an adder, and the pattern detection result is input to a selector. The selector selects the accumulation result obtained up to that point in accordance with the detection pattern and inputs the selected result to the adder. The adder adds the accumulation result and the newly input reliability Pabs data, and outputs the addition result. A specific register corresponding to the detection pattern, when receiving an enable signal, stores the addition result.

Figures 15, 16:
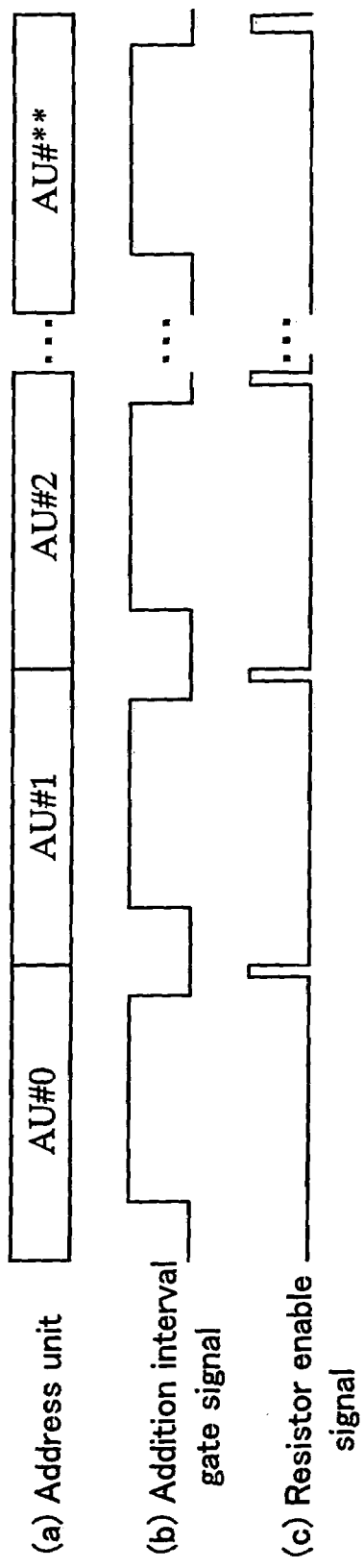
FIG. 15 is a timing chart showing an operation of an edge shift detection circuit.
FIG. 16 shows an example of a recording pattern for learning.

FIG. 15 is a timing chart showing an operation of the edge shift detection circuit 18. For example, in the case where information is recorded on a recording medium in which information is managed address by address, it is assumed to use an addition interval gate signal ((b) of FIG. 15) and a register enable signal ((c) of FIG. 15). Part (a) of FIG. 15 shows an address unit.

In the case where test recording is performed in a user area address by address so as to obtain an edge shift amount, a control needs to be performed for defining an addition interval. When the addition interval gate signal is input to the edge shift detection circuit 18, the addition interval gate signal passes through the two-stage flip-flop and is input to flip-flops FF29 through FF0 (FIG. 14). The flip-flops are reset in a low interval of the addition interval gate signal, and the addition result is stored in a high interval. The register enable signal is generated from the addition interval gate signal. The register enable signal is for storing the addition result to registers REG29 through REG0 at the end of the addition interval gate signal.

Data representing the edge shift amount address by address is stored in the registers REG29 through REG0. The edge shift detection circuit 18, owing to such a circuit configuration, can obtain all the edge shift amounts necessary for optimization of the recording parameter using one adder.

In the exemplary circuit described with reference to FIG. 14, the generation frequency of the recording patterns varies in accordance with the combination of the predetermined length of marks and spaces required for optimization of the recording parameter, among the recording patterns used for test recording (e.g., random patterns). The 30 edge shift amounts detected (R23T, R33T, . . . R45L, R55L) rely on the incidence of the recording patterns. The PLL circuit 7 shown in FIG. 1 automatically detects a threshold value of a slicer (not shown) using a DC component (a low frequency component included in the reproduced signal) and synchronizes the reproduced signal and the reproduction clock signal. Accordingly, it is preferable that the amount of the DC component included in the test recording pattern is as small as possible, such that the feedback control does not influence the clock generation performed by the PLL circuit 7. In consideration of the time required for optimization and precision of optimization, it is preferable to obtain a detection result having a high precision with a minimum possible recording area. Therefore, the following recording pattern is required: a recording pattern which has mark length/space length combinations required for optimization of the recording parameter at the same frequency, in which the code includes no DC component (DSV), and in which the generation frequency, per unit area, of the mark length/space length combinations required for optimization of the recording parameter is high.

FIG. 16 shows an example of a recording pattern for learning. 2M represents a 2T mark, and 2S represents a 2T space. In this example, each of 30 patterns of combinations of 2T through 5T marks and 2T through 5T spaces is generated once in a 108-bit recording pattern. The number of codes "0" and the number of codes "1" including the 108-bit recording pattern are both 54, and the DSV in the recording pattern is 0. By applying this recording pattern to the edge shift detection circuit 18 in FIG. 13, each pattern can be detected the same number of times. Thus, a more accurate shift amount detection result is obtained. In this example, it is assumed that 5T or longer marks or 5T or longer spaces can be recorded with the same recording parameter.

Figure 17:
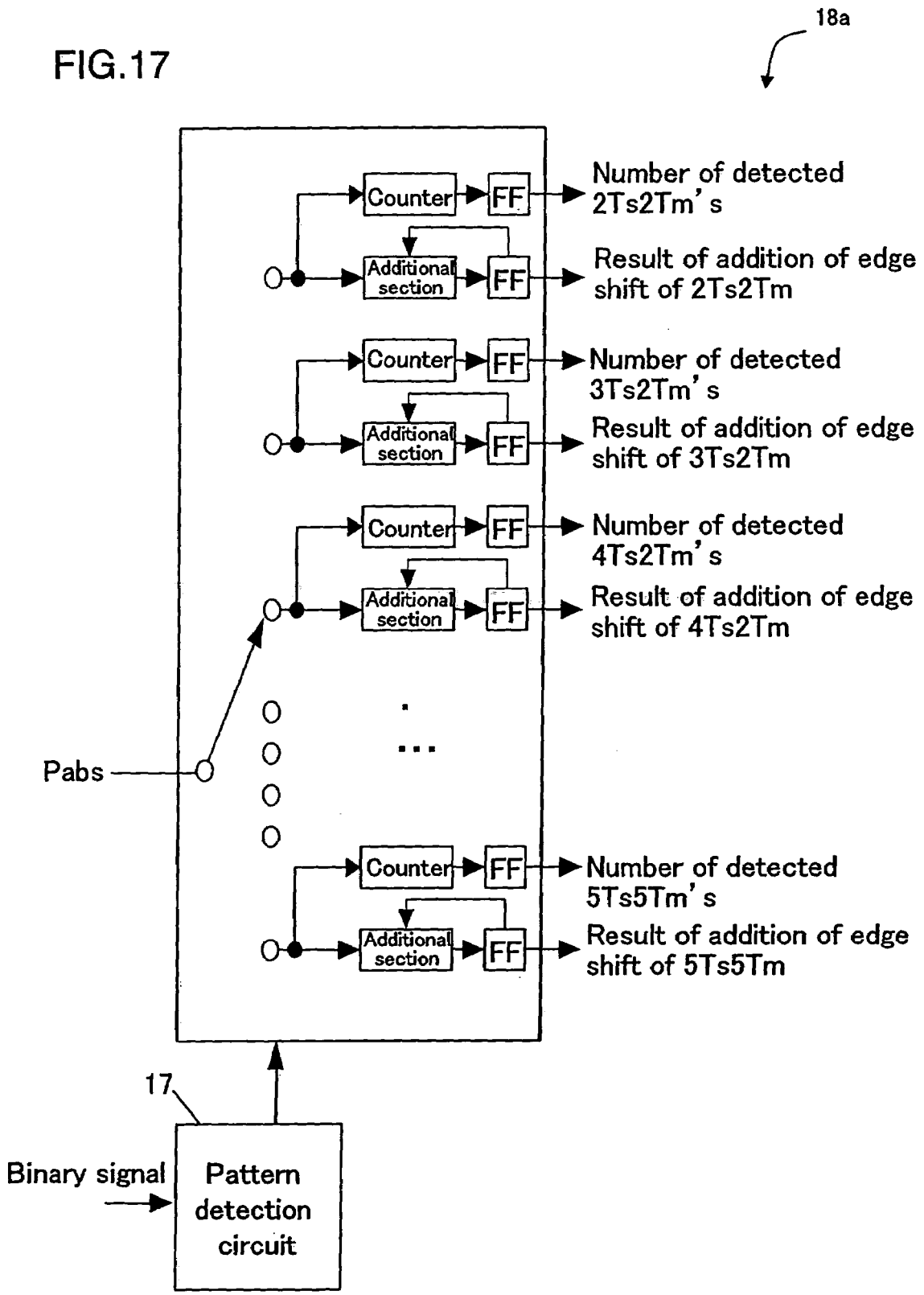
FIG. 17 is a diagram showing an edge shift detection circuit which is a modification of the edge shift detection circuit of FIG. 14.

FIG. 17 shows an edge shift detection circuit 18*a* which is a modification of the edge shift detection circuit 18.

The pattern detection circuit 17 detects an edge of each of specific patterns (30 patterns). The edge shift detection circuit 18*a* accumulates the edge shift amounts corresponding to each of the patterns, and counts the number of times that each pattern has been detected. By dividing each accumulation result of the edge shift amounts with the number of times that the respective pattern has been detected, the average edge shift amount of each specific pattern is obtained. Thus, even when random patterns are used for test recording, it can be determined which is the pattern corresponding to the recording mark having the mark start edge position or the mark termination edge position which should be changed.

As described above, the edge shift detection circuit 18 included in the adjusting section 304 calculates one of an accumulation value or an average value of the reliability of the maximum likelihood decoding result for each recording pattern (i.e., for each mark length/space length combination), and adjusts the shape of the recording signal based on the accumulation value or average value obtained.

In the above example, the state transition rule defined by the recording code having a minimum polarity inversion interval of 2 and the equalization system of PR (1, 2, 2, 1) is used by the maximum likelihood decoding section 9 for performing maximum likelihood decoding. The present invention is not limited to this. The present invention is applicable to use of, for example, a state transition rule defined by the recording code having a minimum polarity inversion interval of 3 and the equalization system of PR (C0, C1, C1, C0), a state transition rule defined by the recording code having a minimum polarity inversion interval of 2 or 3 and the equalization system of PR (C0, C1, C0), and a state transition rule defined by the recording code having a minimum polarity inversion interval of 2 or 3 and the equalization system of PR (C0, C1, C2, C1, C0). C0, C1 and C2 are each an arbitrary positive numeral.

4-2. Recording/Reproduction Method of Embodiment 3

In this example of the present invention, the above-mentioned 8 patterns are detected for each recording pattern (for each combination of a mark length and a space length immediately before the mark, and for each combination of a mark length and a space length immediately after the mark). A recording parameter for optimizing the position of the edge of the recording signal is determined, with specific attention paid to the shape of the recording signal, especially the mark start edge and the mark termination edge.

Paying attention only to the pattern having the minimum |Pa−Pb| value, among the reliability =Pa−Pb| of all the maximum likelihood decoding results of all the patterns, means to pay attention only to the edge of a recording mark. As described above, a pattern having a small value of Pa−Pb has a high error probability. This means that by partially optimizing the position of the edge of a recording mark so as to improve the reliability of the maximum likelihood decoding result, the entire recording parameter is optimized. A method for optimizing the position of the edge of a recording mark will be described hereinafter.

FIGS. 18A to 18H show sample values of 8 patterns (Pattern-1 through Pattern-8). The horizontal axis represents time. One scale represents one channel clock period (Tclk). The vertical axis represents signal level (0 through 6). The dotted line represents path A, and the solid line represents path B. Each sample value corresponds to the expected value Level$_v$ 0 through 6 of the maximum likelihood decoding described above with reference to Table 1.

A recorded portion (amorphous area) is represented as having a signal level below the threshold value of the comparator since the light amount reflected by the recorded portion is lower than the light amount reflected by the other portions. An unrecorded portion (non-amorphous area) is represented as having a signal level above the threshold value of the comparator. The 8 patterns each correspond to a reproduction waveform of a border (mark start edge or mark termination edge) between the recorded portion (mark) and an unrecorded portion (space). Pattern-1 (FIG. 18A), Pattern-2 (FIG. 18B), Pattern-3 (FIG. 18C), and Pattern-4 (FIG. 18D)

each correspond to a mark start edge. Pattern-5 (FIG. 18E), Pattern-6 (FIG. 18F), Pattern-7 (FIG. 18G), and Pattern-8 (FIG. 18H) each correspond to a mark termination edge.

A method for detecting a shift of the mark start edge will be described using Pattern-1 as an example.

FIGS. 19A and 19B show the correlation between the reproduction waveform and the shift of a recording mark of Pattern-1. In FIGS. 19A and 19B, an open triangle represents an input signal. Path A represented by the dotted line is a correct state transition path. The input signal is generated based on a recording mark B1. A recording mark A1 has an ideal position of the mark start edge.

In FIG. 19A, the position of the mark start edge of the recording mark B1 is behind the ideal position. The sample value of the input signal $(y_{k-3}, y_{k-2}, y_{k-1}, y_k)$ is (4.2, 3.2, 1.2, 0.2). From expressions 2 and 3, a distance Pa between the path A and the input signal, and a distance Pb between the path B and the input signal, are obtained by expressions 9 and 10, respectively.

$$Pa=(4.2-4)^2+(3.2-3)^2+(1.2-1)^2+(0.2-0)^2=0.16 \quad \text{(Expression 9)}$$

$$Pb=(4.2-5)^2+(3.2-5)^2+(1.2-3)^2+(0.2-1)^2=7.76 \quad \text{(Expression 10)}$$

The amount and direction of the shift of the mark start edge are obtained by finding |Pa−Pb|−Pstd by expression 9.

$$E1=|Pa-Pb|-Pstd=|0.16-7.76|-10=-2.4 \quad \text{(Expression 11)}$$

The absolute value of E1 obtained by expression 11 is the shift amount, and the sign of E1 is the shift direction. In the case of the recording mark B1 in FIG. 19A, E1=−2.4. This means that the position of the mark start edge of the recording mark B1 is shifted rearward from the reference by 2.4.

In FIG. 19B, the position of the mark start edge of the recording mark B1 is advanced to the ideal position. The sample value of the input signal $(y_{k-3}, y_{k-2}, y_{k-1}, y_k)$ is (3.8, 2.8, 0.8, −0.2). E2 is obtained by E2=|Pa−Pb|−Pstd. E2 is 2.4. This means that the position of the mark start edge of the recording mark B1 is shifted forward from the reference by 2.4.

Figure 20A:
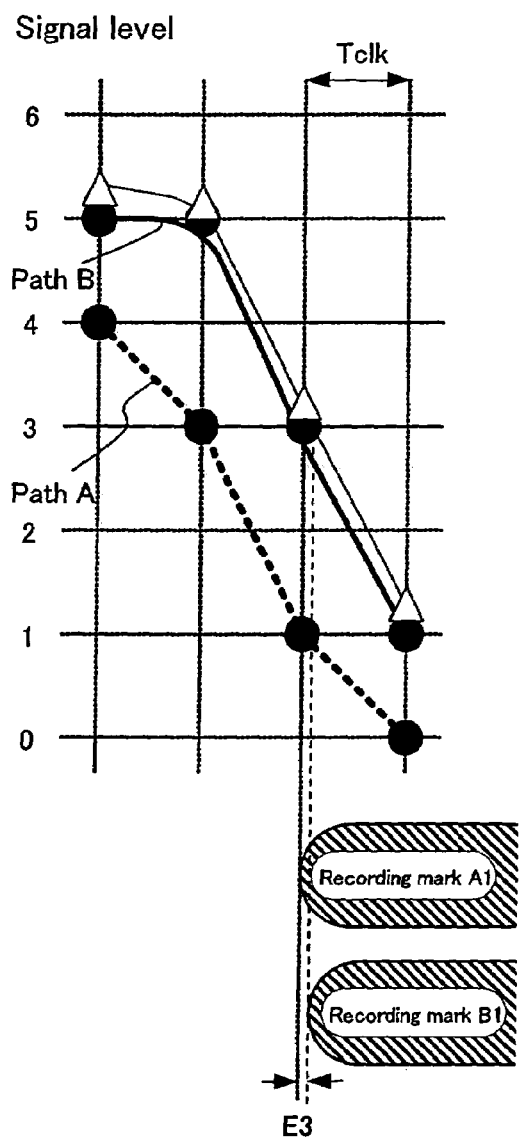
FIGS. 20A and 20B are diagram showing a correlation between a reproduction waveform and a shift of a recording mark of Pattern-1 where path B is the correct path.
Figure 20B:
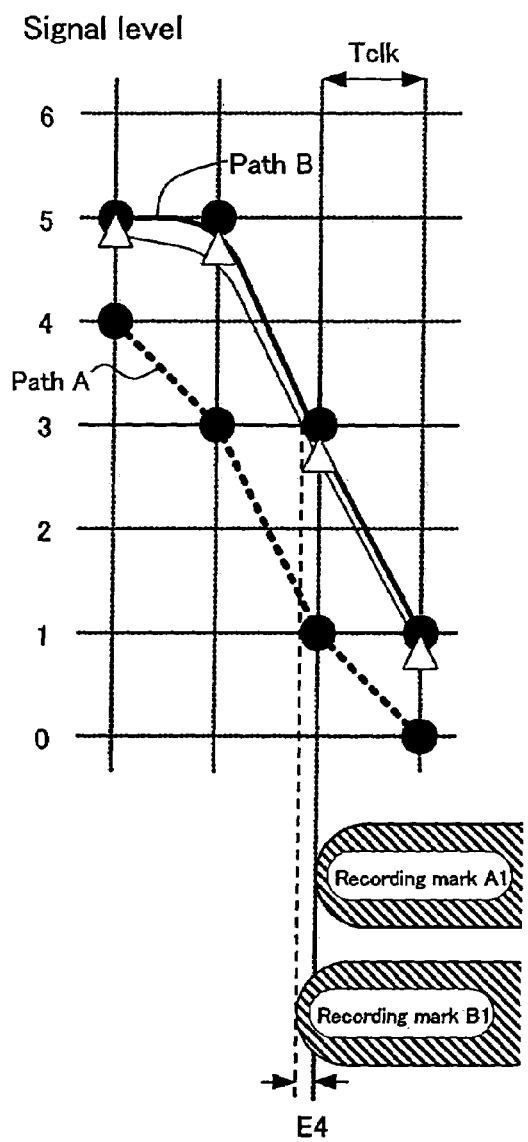

FIGS. 20A and 20B show the correlation between the reproduction waveform and the shift of a recording mark of Pattern-1. In FIGS. 20A and 20B, path B represented by the solid line is a correct state transition path.

In FIG. 20A, the position of the mark start edge of the recording mark B1 is behind the ideal position. The sample value of the input signal $(y_{k-3}, y_{k-2}, y_{k-1}, y_k)$ is (5.2, 5.2, 3.2, 1.2). E3 is obtained by E3=|Pa−Pb|−Pstd. E3 is 2.4. This means that the position of the mark start edge of the recording mark B1 is shifted rearward from the reference by 2.4.

In FIG. 20B, the position of the mark start edge of the recording mark B1 is advanced to the ideal position. The sample value of the input signal $(y_{k-3}, y_{k-2}, y_{k-1}, y_k)$ is (4.8, 4.8, 2.8, 0.8). E4 is obtained by E4=|Pa−Pb|−Pstd. E4 is −2.4. This means that the position of the mark start edge of the recording mark B1 is shifted forward from the reference by 2.4.

Comparing the case of FIGS. 19A and 19B in which path A is the correct state transition path and the case of FIGS. 20A and 20B in which path B is the correct state transition path, the sign of the code representing the shift direction is opposite. The sign of the code relies on the relationship between the expected value series of the correct state transition path and the input signal series, and the relationship between the expected value series of the other candidate path and the input signal series. When the error between the input signal and the expected value of the incorrect candidate path is large as in FIG. 19B and FIG. 20A, the value obtained by expression 11 has a positive sign. Namely, as the difference between the input signal and the expected value of the incorrect candidate path becomes larger, the error probability of the maximum likelihood decoding is lower. In this case, the value obtained by expression 11 has a positive sign. The shift direction of the position of the mark start edge of the recording mark can be detected in consideration of this.

When path A is the correct state transition path in Pattern-1, Pattern-1 is used for detecting the start edge of the recording mark of a combination of a 2T space and a 4T or longer mark. When path B is the correct state transition path in Pattern-1, Pattern-1 is used for detecting the start edge of the recording mark of a combination of a 3T space and a 3T or longer mark.

Using the above-described method, an accumulation value or an average value of each recording pattern (i.e., each mark length/space length combination) is obtained, and a recording parameter is set such that the shift amount of the position of the start edge and termination edge is close to 0. Thus, a recording control optimal for the maximum likelihood decoding method is realized.

It is important to determine whether the start edge or termination edge of a mark formed on a disc is located before or after the reference position. For the purpose of the determination, it is necessary to detect which pattern has a deviated edge. A shift amount is detected for each pattern.

As described with reference to FIGS. 19A and 19B and FIGS. 20A and 20B, the sign of the code representing the shift direction is opposite. Therefore, for example, when a mark is shorter than a reference, the mark has a minus sign. When the minus sign mark is longer than a reference position, the mark has a plus sign. According to this rule, the above-described error value is analyzed for the start edge and termination edge of each mark length, thereby making it possible to detect the length of the start edge and the termination edge of a mark length of interest. Therefore, the correction direction can be determined. In addition, the correction amount can be predicted based on the absolute value of the detected value.

Optimization of a recording parameter will be described. The minimum polarity inversion interval of a recording symbol is represented by m (in this example, m=2). The position of the start edge of a recording mark formed on a recording medium may rely on the length of the space immediately before the recording mark and the length of the recording mark itself. For example, when the length of the space immediately before the recording mark is mT to (m+b) T, the position of the mark start edge of the recording mark relies on the length of the space immediately before the recording mark. When the length of the space immediately before the recording mark is greater than (m+b) T, the position of the mark start edge of the recording mark does not rely on the length of the space immediately before the recording mark. When the length of the recording mark itself is mT to (m+a)T, the position of the mark start edge of the recording mark relies on the length of the recording mark itself. When the length of the recording mark itself is greater than (m+a) T, the position of the mark start edge of the recording mark does not rely on the length of the recording mark itself.

The position of the termination edge of a recording mark formed on a recording medium may rely on the length of the space immediately after the recording mark and the length of the recording mark itself. For example, when the length of the recording mark itself is mT to (m+a)T, the position of the mark termination edge of the recording mark relies on the length of the recording mark itself. When the length of the recording mark itself is greater than (m+a)T, the position of the mark termination edge of the recording mark does not rely on the length of the recording mark itself. When the length of the space immediately after the recording mark is mT to (m+b)T, the position of the mark termination edge of the recording mark relies on the length of the space immediately after the recording mark. When the length of the space immediately after the recording mark is greater than (m+b)T, the position of the mark termination edge of the recording mark does not rely on the length of the space immediately after the recording mark. In the above, "a" and "b" are each an integer of 0 or greater, and the minimum polarity inversion interval of the recording symbol is greater than m+a and m+b.

In consideration of the position of the mark start edge and the position of the mark termination edge of a recording mark, the optimization of the parameter Tsfp at the mark start edge needs to be performed on a recording mark adjacent to a space having a length of (m+b)T or less. The optimization of the parameter Telp at the mark termination edge needs to be performed on a recording mark having a length of (m+a)T or less.

FIG. 21 shows a list of recording parameters requiring optimization. Where, for simplicity, m=3 and a=b=3, the parameter needs to be optimized for 32 recording patterns shown in FIG. 8. In FIG. 8, 2Ts2Tm, for example, means a pattern in which a 2T space exists immediately before a 2T mark.

FIG. 22 shows a pattern(s) of the particular eight patterns which is used to detect a recording parameter requiring optimization. In other words, a pattern(s) of the above-described 8 patterns (Pattern-1 to Pattern-8) which is used to detect each recording pattern (i.e., an edge pattern) is shown.

For example, the shift amount of the signal corresponding to a 2Ts3Tm recording pattern (FIG. 21) is detected using P3A. P3A is Pattern-3 in which path A is the correct state transition path.

The shift amount of the signal of a 3Ts3Tm recording pattern (FIG. 21) is detected using P1B or P4A. P1B is a Pattern-1 in which path B is the correct state transition path. P4A is a Pattern-4 in which path A is the correct state transition path.

As can be appreciated from the above, a method for controlling a recording parameter optimal for the maximum likelihood decoding method is to change the recording parameter such that the shift amount of the signal corresponding to every recording pattern shown in FIG. 22 is close to 0.

The shift amount of the signal corresponding to each of a 2Ts2Tm recording pattern (a 2T space is present immediately before a 2T mark) and a 2Tm2Ts (a 2T space is present immediately after a 2T mark) cannot be detected by any of the 8 patterns described above. Thus, the shift amount needs to be optimized by another method (see FIG. 22). However, the 2Ts2Tm recording pattern and the 2Tm2Ts recording pattern have a relatively large value of reliability Pa–Pb and thus are not included in the above 8 patterns. In other words, at the mark start edge or mark termination edge of the recording mark of each of the 2Ts2Tm recording pattern and the 2Tm2Ts recording pattern, the error probability is low; it is not necessary to strictly optimize the recording parameter of these recording patterns. Therefore, an appropriate initial value may be used as the recording parameter instead of optimizing such shift amounts for each information recording medium. Alternatively, the 2Ts2Tm recording pattern and the 2Tm2Ts recording pattern may be optimized such that the accumulation value of the phase errors of the reproduced signal is minimal.

In the foregoing description, recording pulse (write strategy) adjustment is explained rather than power adjustment. The present invention is characterized in that a detection value (edge shift value), which is conventionally used for recording pulse adjustment, is used for power adjustment. By using the above-described edge shift value, the length of a recorded mark on a recording medium can be measured. Therefore, a recording power is adjusted so that a mark length becomes a predetermined length. A recording power parameter to be adjusted may be any of a write power, an erase power and a bottom power.

For example, a method for adjusting a write power parameter will be described. While keeping a predetermined ratio relationship between an erase power and a bottom power, and a write power, test recording is performed by changing a write power. A recording pattern is assumed to be a 5T-single pattern. An edge shift value of 5Ts5Tm5Tm5Ts is detected (see FIG. 21).

Figure 23:
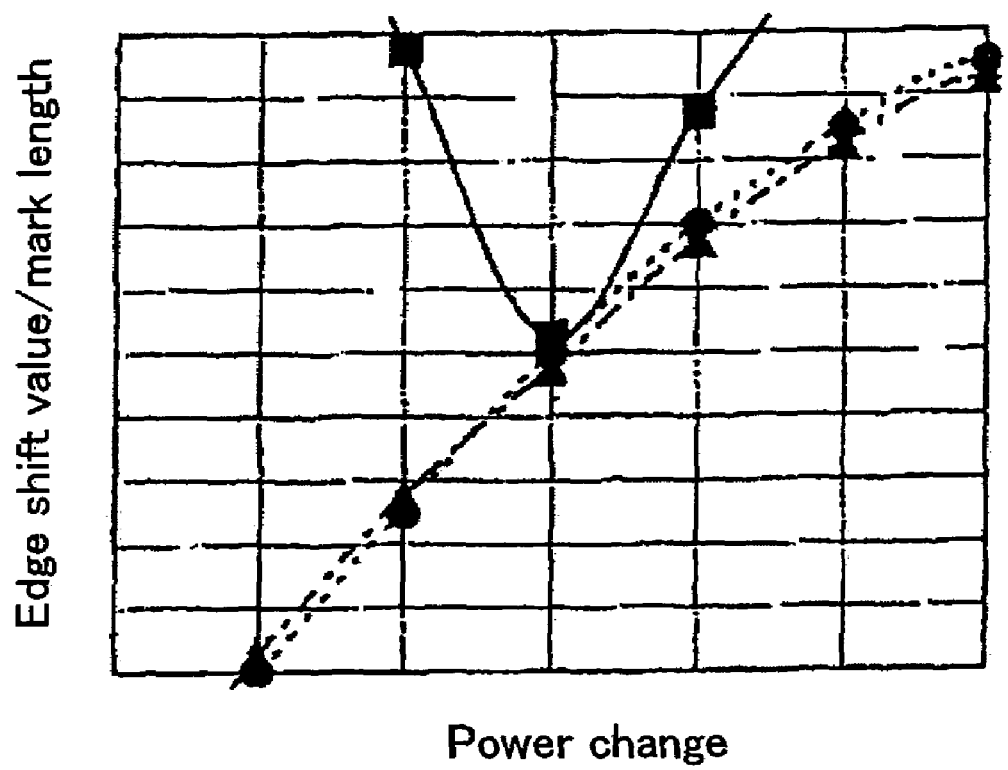
FIG. 23 is a diagram showing an edge shift value (filled triangle) of 5Ts5Tm, 5Tm5Ts with respect to a change in power, the absolute value (filled square) of a 5T mark length measured based on an edge shift value (filled circle) of 5Ts5Tm, and an edge shift value of 5Tm5Ts.
Figure 24:
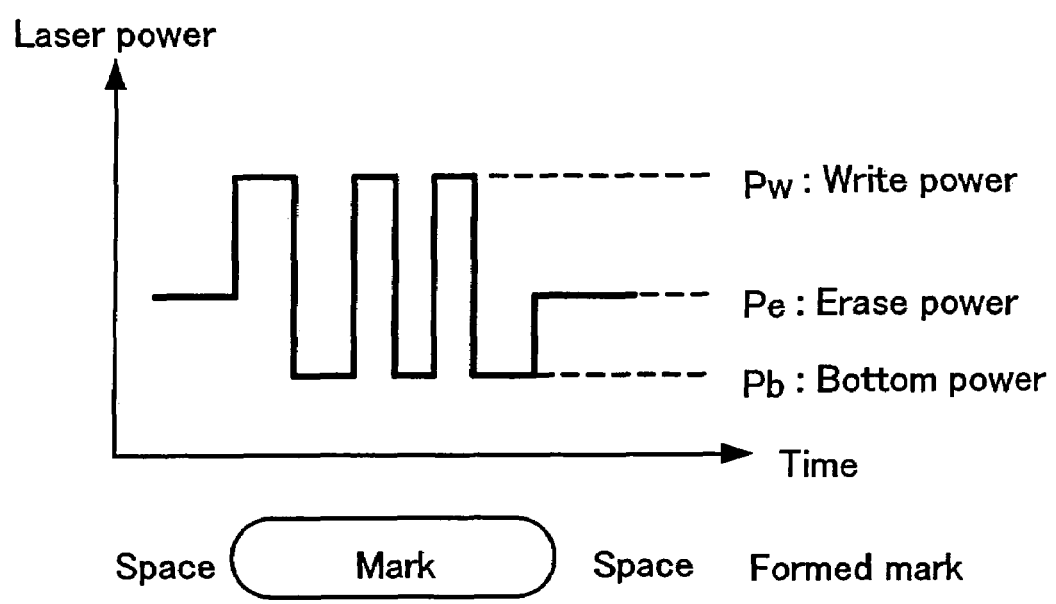
FIG. 24 is a diagram showing a multipulse having a write power Pw, an erase power Pe and a bottom power Pb.

FIG. 23 shows an edge shift value (filled triangle) of 5Ts5Tm, 5Tm5Ts with respect to a change in power, the absolute value (filled square) of a 5T mark length measured based on an edge shift value (filled circle) of 5Ts5Tm, and an edge shift value of 5Tm5Ts.

The 5T mark length is obtained by addition of the edge shift value of 5Ts5Tm and the edge shift value of 5Tm5Ts. A recording power is adjusted so that the addition value becomes about 0.

Note that the above-described addition value and the target value of a mark length may be change depending on the characteristics of a disc. In addition, a recording pattern may be a single pattern, a particular pattern, or a random pattern.

When a recording pattern other than a single mark is used, a width of a mark is detected for each recorded mark length and power adjustment is performed so that the average of all mark lengths or the sum of all mark lengths is a target mark length for each disc.

Recording power adjustment may be performed for each of an environmental change (temperature, humidity), a change in characteristics in a disk plane, a required time, and a predetermined operation. In this case, a recording operation is suspended, an area recorded immediately before the suspension is reproduced, and a mark width is detected for each recorded mark length. When the mark length is determined to be short, a recording power may be increased depending on the mark width. When the mark length is determined to be long, a recording power may be decreased depending on the mark width. The determination may be made based on all mark lengths. When only based on the width of a short mark having a relatively high sensitivity, it may be determined whether a power is increased or decreased.

Mark lengths up to 5T have been described with reference to FIGS. 21 and 22. For mark lengths of 5T or more, an edge shift value can be measured for each mark length.

Embodiments 1 to 3 of the present invention have been heretofore described with reference to FIGS. 1 to 23.

The elements of the recording/reproduction apparatuses 100, 200 and 300 of the present invention may be implemented as either hardware or software. For example, an operation performed by at least one of the shaping section 8, the maximum likelihood decoding section 9, the reliability calculation section 10 and the recording medium controller 11 may be implemented as a program which can be executed by a computer.

In Embodiments 1 to 3 of the present invention, the recording section 103 and the recording section 303 record a piece of test information onto the recording medium 1 using a plurality of recording powers. Alternatively, the recording section 103 and the recording section 303 may record a plurality of pieces of test information onto the recording medium 1 using a plurality of recording powers. Further, the recording section 103 and the recording section 303 may record a piece of test information onto the recording medium 1 using a single recording power. Furthermore, the recording section 103 and the recording section 303 may record a plurality of pieces of test information onto the recording medium 1 using a single recording power.

In Embodiments 1 to 3, an index M is defined by expression 6 including the variance of |Pa−Pb|−Pstd. The present invention is not limited to this. For example, a value obtained by integrating Pa−Pb or |Pa−Pb|−Pstd a predetermined number of times may be used as an index M.

In Embodiments 1 to 3, the recording pulse described with reference to FIG. 2 is used. The present invention is not limited to this. For example, the present invention can be applied to a recording power control of a recording medium which does not require a cooling pulse (bottom power level). In this case, only a write power and an erase power are controlled.

Further, in Embodiments 1 to 3, a test signal is not limited to those described above. A test pattern may be a combination of a relatively long mark/space and a relatively short mark/space where the mark and the space have the same probability of incidence. For example, such a test pattern includes a repeat pattern of 8Tm3Ts8Tm8Ts3Tm8Ts and a repeat pattern of 7Tm2Ts7Tm7Ts2Tm7Ts.

Further, in Embodiments 1 to 3, the recording modulation rule and the PRML technique are not limited to those described above. Various recording modulation rules and various characteristic PRML techniques may be combined. For example, (1, 7) Run Length Limited code and PR (1, 2, 1)ML or PR (1, 2, 2, 2, 1)ML may be combined. 8-6 modulation code, which is used for CD and DVD, may be combined with the above-described PRML technique.

Further, in Embodiments 1 to 3, power ranges which are searched for Pwo, Peo and Pbo are not limited to those described above. For example, each power search range may be ±x % (e.g., x=10) around are commended value. If an optimum point is not detected in this range as shown in FIG. 18, an upper or lower limit may be provided.

Further, in Embodiments 1 to 3, when Pwo is searched for, the parameter is changed while the Pe/Pw ratio is fixed.

The present invention is not limited to this. For example, Pwo may be obtained by changing Pw while Pe and Pb are fixed to appropriate values.

The optical disc recording/reproduction apparatus of the present invention optimizes a recording power during recording by using a reproduced signal evaluation index which is correlated with decoding performance in a processing system employing maximum likelihood decoding for processing a reproduced signal. As a result, a recorded state can be optimized and errors can be minimized during reproduction. In the present invention, a change in reproduced waveform due to a change in recording power can be detected with high precision, as compared to when a reproduced signal quality index, such as jitter, asymmetry, BER or the like, which are conventionally used for recording power control is used. Therefore, recording power control can be performed with high precision. Since a recording power can be determined with high precision, performance degradation due to cross power can be minimized, resulting in stable compatibility of optical disc drive apparatuses and optical disc media having the same standard.

Conventionally, no appropriate parameter can be obtained with high precision using a reproduced signal evaluation index, such as jitter, asymmetry, BER or the like to determine and set an optimum recording parameter with high precision.

In the present invention, by detecting a state, which is recorded using a metric expected value error of only a state transition pattern (a pattern with the minimum Euclid distance) involved in the vicinity of an edge of a reproduced waveform among a number of state transition patterns in the PRML algorithm, variations in the power of a recording leading pulse (write power), the bottom power of a cooling pulse or the ratio of a write power/an erase power can be detected with high precision, and based on the result, a recording power is controlled during recording to optimize a recorded state. In order to perform recording power control with higher precision, a test signal for use in test recording has a particular pattern capable of detecting a change in a reproduced waveform corresponding to a change in a recording power with high precision.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. A recording/reproduction apparatus, comprising:
   a first recording section for recording at least one piece of test information onto a medium using at least one recording power;
   a reproduction section for reproducing at least one test signal indicating the at least one piece of test information from the medium; and
   a second recording section for recording information onto the medium using one of the at least one recording power,
   wherein the reproduction section comprises:
      a decoding section for performing maximum likelihood decoding of the at least one test signal and generating at least one binary signal indicating a result of the maximum likelihood decoding;
      a calculation section comprising:
         a differential metric detection section for calculating a reliability of the result of the maximum likelihood decoding based on a state transition sequence identified by the at least one binary signal and a result of calculation of a Euclid distance between the at least one test signal and at least one target value used in the maximum likelihood decoding;
         a determination section for determining whether or not a recorded state is normal based on the reliability calculated by the differential metric detection section; and
         an adjustment section for adjusting a recording power for recording the information onto the medium to the one recording power based on the reliability calculated by the differential metric detection section.

2. A recording/reproduction method, comprising:
   recording at least one piece of test information onto a medium using at least one recording power;
   reproducing at least one test signal inddicating the at least one piece of test information from the medium; and
   recording information onto the medium using one of the at least one recording power, wherein the reproducing step comprises;
- performing maximum likelihood decoding of the at least one test signal and generating at least one binary signal indicating a result of the maximum likelihood decoding;
- calculating a reliability of the result of the maximum likelihood decoding based on a state transition sequence identified by the at least one binary signal and a result of calculation of a Euclid distance between the at least one test signal and at least one target value used in the maximum likelihood decoding; and
- adjusting a recording power for recording the information onto the medium to the one recording power based on the reliability.

* * * * *